(12) United States Patent
Herrnberger et al.

(10) Patent No.: US 11,542,190 B2
(45) Date of Patent: Jan. 3, 2023

(54) SUBSTRATE PROCESSING STATION FOR LASER-BASED MACHINING OF SHEET-LIKE GLASS SUBSTRATES

(71) Applicant: Corning Incorporated, Corning, NY (US)

(72) Inventors: Frank Fabian Herrnberger, Munich (DE); Michael Klein, Gilching (DE); Albert Roth Nieber, Painted Post, NY (US); Florian Spaeth, Eching (DE); Marco Wolfert, Munich (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/791,774

(22) Filed: Oct. 24, 2017

(65) Prior Publication Data
US 2018/0111870 A1 Apr. 26, 2018

Related U.S. Application Data

(60) Provisional application No. 62/411,938, filed on Oct. 24, 2016.

(51) Int. Cl.
*C03B 33/037* (2006.01)
*C03B 33/02* (2006.01)
(Continued)

(52) U.S. Cl.
CPC .......... *C03B 33/037* (2013.01); *B23K 26/046* (2013.01); *B23K 26/0838* (2013.01);
(Continued)

(58) Field of Classification Search
CPC .................................................. C03B 33/037
See application file for complete search history.

(56) References Cited

U.S. PATENT DOCUMENTS

| 1,529,243 A | 3/1925 | Drake et al. |
| 1,626,396 A | 4/1927 | Drake |

(Continued)

FOREIGN PATENT DOCUMENTS

| CN | 1259924 A | 7/2000 |
| CN | 2388062 Y | 7/2000 |

(Continued)

OTHER PUBLICATIONS

Unichains, Engineering Manual: Innovative Belt & Chain solutions for every industry and application, available publically at least as of Jun. 1, 2016 as evidenced at the following hyperlink: https://web.archive.org/web/20160601OOOOOO*/http://www.unichains.com/.

(Continued)

*Primary Examiner* — Queenie S Dehghan
(74) *Attorney, Agent, or Firm* — Amy T. Lang; Svetlana Z. Short

(57) ABSTRACT

A glass sheet processing apparatus includes a first gantry assembly that extends across a glass sheet in a cross-machine direction. The first gantry assembly includes a processing head that moves along a length of the first gantry assembly and includes a laser comprising an optical arrangement positioned in a beam path of the laser providing a laser beam focal line that is formed on a beam output side of the optical arrangement. A second gantry assembly extends across the glass sheet in the cross-machine direction. The second gantry assembly includes a processing head that moves along a length of the second gantry assembly.

12 Claims, 14 Drawing Sheets

(51) Int. Cl.
*C03B 33/03* (2006.01)
*B23K 26/08* (2014.01)
*B23K 26/046* (2014.01)
*B23K 26/38* (2014.01)
*B23K 26/042* (2014.01)
*B65G 49/06* (2006.01)
*B23K 26/402* (2014.01)

(52) U.S. Cl.
CPC ......... *B23K 26/0876* (2013.01); *B23K 26/38* (2013.01); *B23K 26/402* (2013.01); *B65G 49/064* (2013.01); *C03B 33/0222* (2013.01); *C03B 33/03* (2013.01); *B65G 2249/04* (2013.01)

(56) References Cited

U.S. PATENT DOCUMENTS

| | | |
|---|---|---|
| 1,790,397 A | 1/1931 | Woods et al. |
| 2,682,134 A | 6/1954 | Stookey |
| 2,749,794 A | 6/1956 | O'Leary |
| 2,754,956 A | 7/1956 | Sommer |
| 3,647,410 A | 3/1972 | Heaton et al. |
| 3,673,900 A | 7/1972 | Jendrisak et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 3,947,093 A | 3/1976 | Goshima et al. |
| 4,076,159 A | 2/1978 | Farragher |
| 4,226,607 A | 10/1980 | Domken |
| 4,441,008 A | 4/1984 | Chan |
| 4,546,231 A | 10/1985 | Gresser et al. |
| 4,618,056 A | 10/1986 | Cutshall |
| 4,623,776 A | 11/1986 | Buchroeder et al. |
| 4,642,439 A | 2/1987 | Miller et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,951,457 A | 8/1990 | Deal |
| 4,997,250 A | 3/1991 | Ortiz, Jr. |
| 5,035,918 A | 7/1991 | Vyas |
| 5,040,182 A | 8/1991 | Spinelli et al. |
| 5,104,210 A | 4/1992 | Tokas |
| 5,104,523 A | 4/1992 | Masaharu et al. |
| 5,108,857 A | 4/1992 | Kitayama et al. |
| 5,112,722 A | 5/1992 | Tsujino et al. |
| 5,114,834 A | 5/1992 | Nachshon |
| 5,221,034 A | 6/1993 | Bando |
| 5,256,853 A | 10/1993 | McIntyre |
| 5,265,107 A | 11/1993 | Delfyett |
| 5,326,956 A | 7/1994 | Lunney |
| 5,400,350 A | 3/1995 | Galvanauskas et al. |
| 5,410,567 A | 4/1995 | Brundage et al. |
| 5,418,803 A | 5/1995 | Zhiglinsky et al. |
| 5,434,875 A | 7/1995 | Rieger et al. |
| 5,436,925 A | 7/1995 | Lin et al. |
| 5,475,197 A | 12/1995 | Wrobel et al. |
| 5,521,352 A | 5/1996 | Lawson |
| 5,541,774 A | 7/1996 | Blankenbecler |
| 5,553,093 A | 9/1996 | Ramaswamy et al. |
| 5,574,597 A | 11/1996 | Kataoka et al. |
| 5,578,229 A | 11/1996 | Barnekov et al. |
| 5,586,138 A | 12/1996 | Yokayama |
| 5,656,186 A | 8/1997 | Mourou et al. |
| 5,676,866 A | 10/1997 | Schulte et al. |
| 5,684,642 A | 11/1997 | Zumoto et al. |
| 5,692,703 A | 12/1997 | Murphy et al. |
| 5,696,782 A | 12/1997 | Harter et al. |
| 5,715,346 A | 2/1998 | Liu |
| 5,736,061 A | 4/1998 | Fukada et al. |
| 5,736,709 A | 4/1998 | Neiheisel |
| 5,776,220 A | 7/1998 | Allaire et al. |
| 5,781,684 A | 7/1998 | Liu |
| 5,796,112 A | 8/1998 | Ichie |
| 5,854,490 A | 12/1998 | Ooaeh et al. |
| 5,854,751 A | 12/1998 | Di et al. |
| 5,878,866 A | 3/1999 | Lisec |
| 5,968,441 A | 10/1999 | Seki |
| 6,003,418 A | 12/1999 | Bezama et al. |
| 6,016,223 A | 1/2000 | Suzuki et al. |
| 6,016,324 A | 1/2000 | Rieger et al. |
| 6,027,062 A | 2/2000 | Bacon et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,137,632 A | 10/2000 | Bernacki |
| 6,156,030 A | 12/2000 | Neev |
| 6,160,835 A | 12/2000 | Kwon |
| 6,185,051 B1 | 2/2001 | Chen et al. |
| 6,186,384 B1 | 2/2001 | Sawada |
| 6,191,880 B1 | 2/2001 | Schuster |
| 6,210,401 B1 | 4/2001 | Lai |
| 6,256,328 B1 | 7/2001 | Delfyett et al. |
| 6,259,058 B1 | 7/2001 | Hoekstra |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,461,223 B1 | 10/2002 | Bando |
| 6,484,052 B1 | 11/2002 | Visuri et al. |
| 6,489,589 B1 | 12/2002 | Alexander |
| 6,501,576 B1 | 12/2002 | Seacombe |
| 6,501,578 B1 | 12/2002 | Bernstein et al. |
| 6,520,057 B1 * | 2/2003 | Steadman ............... B26D 5/00 700/134 |
| 6,552,301 B2 | 4/2003 | Herman et al. |
| 6,573,026 B1 | 6/2003 | Aitken et al. |
| 6,592,703 B1 | 7/2003 | Habeck et al. |
| 6,611,647 B2 | 8/2003 | Berkey et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,151 B1 | 5/2004 | Thompson |
| 6,729,161 B1 | 5/2004 | Miura et al. |
| 6,737,345 B1 | 5/2004 | Lin et al. |
| 6,744,009 B1 | 6/2004 | Xuan et al. |
| 6,787,732 B1 | 9/2004 | Xuan et al. |
| 6,791,935 B2 | 9/2004 | Hatano et al. |
| 6,800,237 B1 | 10/2004 | Yamamoto et al. |
| 6,800,831 B1 | 10/2004 | Hoetzel |
| 6,856,379 B2 | 2/2005 | Schuster |
| 6,885,502 B2 | 4/2005 | Schuster |
| 6,904,218 B2 | 6/2005 | Sun et al. |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,102,118 B2 | 9/2006 | Acker et al. |
| 7,187,833 B2 | 3/2007 | Mishra |
| 7,196,841 B2 | 3/2007 | Melzer et al. |
| 7,259,354 B2 | 8/2007 | Pailthorp et al. |
| 7,353,829 B1 | 4/2008 | Wachter et al. |
| 7,402,773 B2 | 7/2008 | Nomaru |
| 7,408,616 B2 | 8/2008 | Gruner et al. |
| 7,408,622 B2 | 8/2008 | Fiolka et al. |
| 7,511,886 B2 | 3/2009 | Schultz et al. |
| 7,535,634 B1 | 5/2009 | Savchenkov et al. |
| 7,555,187 B2 | 6/2009 | Bickham et al. |
| 7,565,820 B2 | 7/2009 | Foster et al. |

(56) References Cited

U.S. PATENT DOCUMENTS

| | | |
|---|---|---|
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 7,794,904 B2 | 9/2010 | Brueck |
| 7,800,734 B2 | 9/2010 | Komatsuda |
| 7,832,675 B2 | 11/2010 | Bumgarner et al. |
| 7,901,967 B2 | 3/2011 | Komura et al. |
| 7,920,337 B2 | 4/2011 | Perchak |
| 7,978,408 B2 | 7/2011 | Sawabe et al. |
| 8,035,803 B2 | 10/2011 | Fiolka |
| 8,035,882 B2 | 10/2011 | Fanton et al. |
| 8,035,901 B2 | 10/2011 | Abramov et al. |
| 8,041,127 B2 | 10/2011 | Whitelaw |
| 8,041,172 B2 | 10/2011 | Sillard et al. |
| 8,068,279 B2 | 11/2011 | Schuster et al. |
| 8,104,385 B2 | 1/2012 | Hayashi et al. |
| 8,118,971 B2 | 2/2012 | Hori et al. |
| 8,123,515 B2 | 2/2012 | Schleelein |
| 8,132,427 B2 | 3/2012 | Brown et al. |
| 8,144,308 B2 | 3/2012 | Muramatsu |
| 8,158,514 B2 | 4/2012 | Krueger et al. |
| 8,164,818 B2 | 4/2012 | Collins et al. |
| 8,168,514 B2 | 5/2012 | Garner et al. |
| 8,194,170 B2 | 6/2012 | Golub et al. |
| 8,211,259 B2 | 7/2012 | Sato et al. |
| 8,218,929 B2 | 7/2012 | Bickham et al. |
| 8,237,918 B2 | 8/2012 | Totzeck et al. |
| 8,245,539 B2 | 8/2012 | Lu et al. |
| 8,245,540 B2 | 8/2012 | Abramov et al. |
| 8,248,600 B2 | 8/2012 | Matousek et al. |
| 8,259,393 B2 | 9/2012 | Fiolka et al. |
| 8,269,138 B2 | 9/2012 | Garner et al. |
| 8,279,524 B2 | 10/2012 | Fiolka et al. |
| 8,283,595 B2 | 10/2012 | Fukuyo et al. |
| 8,283,695 B2 | 10/2012 | Salcedo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,339,578 B2 | 12/2012 | Omura |
| 8,341,976 B2 | 1/2013 | Dejneka et al. |
| 8,347,551 B2 | 1/2013 | Van Der Drift |
| 8,347,651 B2 | 1/2013 | Abramov et al. |
| 8,358,868 B2 | 1/2013 | Iketani |
| 8,358,888 B2 | 1/2013 | Ramachandran |
| 8,379,188 B2 | 2/2013 | Mueller et al. |
| 8,444,905 B2 | 5/2013 | Li et al. |
| 8,444,906 B2 | 5/2013 | Lee et al. |
| 8,448,471 B2 | 5/2013 | Kumatani et al. |
| 8,475,507 B2 | 7/2013 | Dewey et al. |
| 8,482,717 B2 | 7/2013 | Fiolka et al. |
| 8,491,983 B2 | 7/2013 | Ono et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,857 B2 | 1/2014 | Crosbie |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,687,932 B2 | 4/2014 | Peckham et al. |
| 8,697,228 B2 | 4/2014 | Carre et al. |
| 8,720,228 B2 | 5/2014 | Li |
| 8,724,937 B2 | 5/2014 | Barwicz et al. |
| 8,826,696 B2 | 9/2014 | Brown et al. |
| 8,842,358 B2 | 9/2014 | Bareman et al. |
| 8,847,112 B2 | 9/2014 | Panarello et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,028,613 B2 | 5/2015 | Kim et al. |
| 9,052,605 B2 | 6/2015 | Van et al. |
| 9,086,509 B2 | 7/2015 | Knutson |
| 9,138,913 B2 | 9/2015 | Arai et al. |
| 9,170,500 B2 | 10/2015 | Van et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,341,912 B2 | 5/2016 | Shrivastava et al. |
| 9,346,706 B2 | 5/2016 | Bazemore et al. |
| 9,446,590 B2 | 9/2016 | Chen et al. |
| 9,477,037 B1 | 10/2016 | Bickham et al. |
| 9,481,598 B2 | 11/2016 | Bergh |
| 9,499,343 B2 | 11/2016 | Cornelissen et al. |
| 9,517,929 B2 | 12/2016 | Hosseini |
| 9,517,963 B2 | 12/2016 | Marjanovic et al. |
| 9,701,581 B2 | 7/2017 | Kangastupa et al. |
| 9,703,167 B2 | 7/2017 | Parker et al. |
| 9,815,730 B2 | 11/2017 | Marjanovic et al. |
| 9,850,160 B2 | 12/2017 | Marjanovic et al. |
| 9,873,628 B1 | 1/2018 | Haloui et al. |
| 9,878,304 B2 | 1/2018 | Kotake et al. |
| 10,190,363 B2 | 1/2019 | Behmke et al. |
| 10,730,783 B2 | 8/2020 | Akarapu et al. |
| 2001/0019404 A1 | 9/2001 | Schuster et al. |
| 2001/0027842 A1 | 10/2001 | Curcio et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0097488 A1 | 7/2002 | Hay et al. |
| 2002/0110639 A1 | 8/2002 | Bruns |
| 2002/0126380 A1 | 9/2002 | Schuster |
| 2002/0139786 A1 | 10/2002 | Amako et al. |
| 2003/0006221 A1 | 1/2003 | Hong et al. |
| 2003/0007772 A1 | 1/2003 | Borrelli et al. |
| 2003/0007773 A1 | 1/2003 | Kondo et al. |
| 2003/0038225 A1 | 2/2003 | Mulder et al. |
| 2003/0070706 A1 | 4/2003 | Fujioka |
| 2003/0227663 A1 | 12/2003 | Agrawal et al. |
| 2004/0051982 A1 | 3/2004 | Perchak |
| 2004/0075717 A1 | 4/2004 | O'Brien et al. |
| 2004/0108467 A1 | 6/2004 | Eurlings et al. |
| 2004/0144231 A1 | 7/2004 | Hanada |
| 2004/0021615 A1 | 11/2004 | Postupack et al. |
| 2004/0218882 A1 | 11/2004 | Bickham et al. |
| 2004/0221615 A1 | 11/2004 | Postupack et al. |
| 2004/0228593 A1 | 11/2004 | Sun et al. |
| 2005/0024743 A1 | 2/2005 | Camy-Peyret |
| 2005/0064707 A1 | 3/2005 | Sinha |
| 2005/0098458 A1 | 5/2005 | Gruetzmacher et al. |
| 2005/0098548 A1 | 5/2005 | Kobayashi et al. |
| 2005/0115938 A1 | 6/2005 | Sawaki et al. |
| 2005/0116938 A1 | 6/2005 | Ito et al. |
| 2005/0205778 A1 | 9/2005 | Kitai et al. |
| 2005/0209898 A1 | 9/2005 | Asai et al. |
| 2005/0231651 A1 | 10/2005 | Myers et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0021385 A1 | 2/2006 | Cimo et al. |
| 2006/0028706 A1 | 2/2006 | Totzeck et al. |
| 2006/0028728 A1 | 2/2006 | Li |
| 2006/0050261 A1 | 3/2006 | Brotsack |
| 2006/0109874 A1 | 5/2006 | Shiozaki et al. |
| 2006/0118529 A1 | 6/2006 | Aoki et al. |
| 2006/0127679 A1 | 6/2006 | Gulati et al. |
| 2006/0146384 A1 | 7/2006 | Schultz et al. |
| 2006/0151450 A1 | 7/2006 | You et al. |
| 2006/0170617 A1 | 8/2006 | Latypov et al. |
| 2006/0213883 A1 | 9/2006 | Eberhardt et al. |
| 2006/0227440 A1 | 10/2006 | Glukstad |
| 2006/0266744 A1 | 11/2006 | Nomaru |
| 2006/0289410 A1 | 12/2006 | Morita et al. |
| 2006/0291835 A1 | 12/2006 | Nozaki et al. |

(56) References Cited

U.S. PATENT DOCUMENTS

| | | |
|---|---|---|
| 2007/0021548 A1 | 1/2007 | Hattori et al. |
| 2007/0030471 A1 | 2/2007 | Troost et al. |
| 2007/0044606 A1 | 3/2007 | Kang et al. |
| 2007/0045253 A1 | 3/2007 | Jordens et al. |
| 2007/0051706 A1 | 3/2007 | Bovatsek et al. |
| 2007/0053632 A1 | 3/2007 | Popp |
| 2007/0068648 A1 | 3/2007 | Hu et al. |
| 2007/0090180 A1 | 4/2007 | Griffis et al. |
| 2007/0091977 A1 | 4/2007 | Sohn et al. |
| 2007/0111119 A1 | 5/2007 | Hu et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0209029 A1 | 9/2007 | Ivonin et al. |
| 2007/0228616 A1 | 10/2007 | Bang |
| 2007/0298529 A1 | 12/2007 | Maeda et al. |
| 2008/0000884 A1 | 1/2008 | Sugiura et al. |
| 2008/0050584 A1 | 2/2008 | Noguchi et al. |
| 2008/0079940 A1 | 4/2008 | Sezerman et al. |
| 2008/0087629 A1 | 4/2008 | Shimomura et al. |
| 2008/0099444 A1 | 5/2008 | Misawa et al. |
| 2008/0158529 A1 | 7/2008 | Hansen |
| 2008/0165925 A1 | 7/2008 | Singer et al. |
| 2008/0190981 A1 | 8/2008 | Okajima et al. |
| 2008/0239268 A1 | 10/2008 | Mulder et al. |
| 2008/0309902 A1 | 12/2008 | Rosenbluth |
| 2008/0310465 A1 | 12/2008 | Achtenhagen |
| 2008/0314879 A1 | 12/2008 | Bruland et al. |
| 2008/0318028 A1 | 12/2008 | Winstanley et al. |
| 2009/0013724 A1 | 1/2009 | Koyo et al. |
| 2009/0032510 A1 | 2/2009 | Ando et al. |
| 2009/0033902 A1 | 2/2009 | Mulder et al. |
| 2009/0050661 A1 | 2/2009 | Na et al. |
| 2009/0060437 A1 | 3/2009 | Fini et al. |
| 2009/0091731 A1 | 4/2009 | Ossmann et al. |
| 2009/0104721 A1 | 4/2009 | Hirakata et al. |
| 2009/0157341 A1 | 6/2009 | Cheung |
| 2009/0170286 A1 | 7/2009 | Tsukamoto et al. |
| 2009/0176034 A1 | 7/2009 | Ruuttu et al. |
| 2009/0183764 A1 | 7/2009 | Meyer |
| 2009/0184849 A1 | 7/2009 | Nasiri et al. |
| 2009/0188543 A1* | 7/2009 | Bann ................ B23K 26/364 136/244 |
| 2009/0199694 A1 | 8/2009 | Uh et al. |
| 2009/0212033 A1* | 8/2009 | Beck ................ B23K 26/16 219/121.72 |
| 2009/0242528 A1 | 10/2009 | Howerton et al. |
| 2009/0250446 A1 | 10/2009 | Sakamoto |
| 2009/0293910 A1 | 12/2009 | Ball et al. |
| 2009/0294419 A1 | 12/2009 | Abramov et al. |
| 2009/0294422 A1 | 12/2009 | Lubatschowski et al. |
| 2009/0323160 A1 | 12/2009 | Egerton et al. |
| 2009/0323162 A1 | 12/2009 | Fanton et al. |
| 2009/0324899 A1 | 12/2009 | Feinstein et al. |
| 2009/0324903 A1* | 12/2009 | Rumsby ................ B23K 26/042 428/195.1 |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0027951 A1 | 2/2010 | Bookbinder et al. |
| 2010/0029460 A1 | 2/2010 | Shojiya et al. |
| 2010/0032087 A1 | 2/2010 | Takahashi et al. |
| 2010/0038349 A1 | 2/2010 | Ke et al. |
| 2010/0046761 A1 | 2/2010 | Henn et al. |
| 2010/0086741 A1 | 4/2010 | Bovatsek et al. |
| 2010/0089631 A1 | 4/2010 | Sakaguchi et al. |
| 2010/0089682 A1 | 4/2010 | Martini et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0145620 A1 | 6/2010 | Georgi et al. |
| 2010/0147813 A1 | 6/2010 | Lei et al. |
| 2010/0206008 A1 | 8/2010 | Harvey et al. |
| 2010/0252538 A1 | 10/2010 | Zeygerman |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0320179 A1 | 12/2010 | Morita et al. |
| 2010/0326138 A1 | 12/2010 | Kumatani et al. |
| 2010/0332087 A1 | 12/2010 | Claffee et al. |
| 2011/0017716 A1* | 1/2011 | Rumsby ................ H05K 3/0026 219/121.72 |
| 2011/0023298 A1 | 2/2011 | Chujo et al. |
| 2011/0037149 A1 | 2/2011 | Fukuyo et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0111179 A1 | 5/2011 | Blick et al. |
| 2011/0127697 A1 | 6/2011 | Milne |
| 2011/0132581 A1 | 6/2011 | Moss |
| 2011/0132881 A1 | 6/2011 | Liu |
| 2011/0136303 A1* | 6/2011 | Lee ................ H01L 27/1288 438/158 |
| 2011/0139760 A1 | 6/2011 | Shah et al. |
| 2011/0143470 A1* | 6/2011 | Lee ................ H01L 27/124 438/34 |
| 2011/0177325 A1 | 7/2011 | Tomamoto et al. |
| 2011/0183116 A1 | 7/2011 | Hung et al. |
| 2011/0191024 A1 | 8/2011 | Deluca |
| 2011/0210105 A1 | 9/2011 | Romashko et al. |
| 2011/0238308 A1 | 9/2011 | Miller et al. |
| 2011/0240476 A1 | 10/2011 | Wang et al. |
| 2011/0240611 A1 | 10/2011 | Sandstrom et al. |
| 2011/0240617 A1 | 10/2011 | Cheon et al. |
| 2011/0261429 A1 | 10/2011 | Sbar et al. |
| 2011/0277507 A1 | 11/2011 | Lu et al. |
| 2011/0300691 A1 | 12/2011 | Sakamoto et al. |
| 2011/0318555 A1 | 12/2011 | Bookbinder et al. |
| 2012/0017642 A1 | 1/2012 | Teranishi et al. |
| 2012/0026573 A1 | 2/2012 | Collins et al. |
| 2012/0047951 A1 | 3/2012 | Dannoux et al. |
| 2012/0047956 A1 | 3/2012 | Li |
| 2012/0047957 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0106117 A1 | 5/2012 | Sundaram et al. |
| 2012/0111310 A1 | 5/2012 | Ryu et al. |
| 2012/0125588 A1 | 5/2012 | Nam et al. |
| 2012/0131961 A1 | 5/2012 | Dannoux et al. |
| 2012/0131962 A1* | 5/2012 | Mitsugi ................ C03B 33/033 65/112 |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0147449 A1 | 6/2012 | Bhatnagar et al. |
| 2012/0196071 A1 | 8/2012 | Cornejo et al. |
| 2012/0196454 A1 | 8/2012 | Shah et al. |
| 2012/0205356 A1 | 8/2012 | Pluss |
| 2012/0211923 A1 | 8/2012 | Garner et al. |
| 2012/0214004 A1 | 8/2012 | Hashimoto et al. |
| 2012/0216570 A1 | 8/2012 | Abramov et al. |
| 2012/0229787 A1 | 9/2012 | Van et al. |
| 2012/0234049 A1 | 9/2012 | Bolton |
| 2012/0234807 A1 | 9/2012 | Sercel et al. |
| 2012/0237731 A1 | 9/2012 | Boegli et al. |
| 2012/0255935 A1 | 10/2012 | Kakui et al. |
| 2012/0262689 A1 | 10/2012 | Van et al. |
| 2012/0293784 A1 | 11/2012 | Xalter et al. |
| 2012/0297568 A1 | 11/2012 | Spezzani |
| 2012/0299219 A1 | 11/2012 | Shimoi et al. |
| 2012/0302139 A1 | 11/2012 | Darcangelo et al. |

(56) References Cited

U.S. PATENT DOCUMENTS

| | | |
|---|---|---|
| 2012/0320458 A1 | 12/2012 | Knutson |
| 2012/0324950 A1 | 12/2012 | Dale et al. |
| 2012/0327499 A1 | 12/2012 | Parker et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |
| 2013/0044371 A1 | 2/2013 | Rupp et al. |
| 2013/0047671 A1 | 2/2013 | Kohli |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0071079 A1 | 3/2013 | Peckham et al. |
| 2013/0071080 A1 | 3/2013 | Peckham et al. |
| 2013/0071081 A1 | 3/2013 | Peckham et al. |
| 2013/0075480 A1 | 3/2013 | Yokogi et al. |
| 2013/0078891 A1* | 3/2013 | Lee .................. G01N 21/896 451/41 |
| 2013/0091897 A1* | 4/2013 | Fujii .................. C03B 33/0222 65/112 |
| 2013/0122264 A1 | 5/2013 | Fujii et al. |
| 2013/0126573 A1 | 5/2013 | Hosseini et al. |
| 2013/0126751 A1 | 5/2013 | Mizoguchi et al. |
| 2013/0129947 A1 | 5/2013 | Harvey et al. |
| 2013/0133367 A1 | 5/2013 | Abramov et al. |
| 2013/0136408 A1 | 5/2013 | Bookbinder et al. |
| 2013/0216573 A1 | 5/2013 | Hosseini et al. |
| 2013/0139708 A1 | 6/2013 | Hotta |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0171425 A1 | 7/2013 | Wang et al. |
| 2013/0174607 A1 | 7/2013 | Wootton et al. |
| 2013/0174610 A1 | 7/2013 | Teranishi et al. |
| 2013/0177033 A1 | 7/2013 | Muro et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0220982 A1 | 8/2013 | Thomas et al. |
| 2013/0221053 A1* | 8/2013 | Zhang .................. C03B 33/102 225/2 |
| 2013/0222877 A1 | 8/2013 | Greer et al. |
| 2013/0224439 A1* | 8/2013 | Zhang .................. B23K 26/40 428/157 |
| 2013/0228918 A1 | 9/2013 | Chen et al. |
| 2013/0247615 A1 | 9/2013 | Boek et al. |
| 2013/0248504 A1 | 9/2013 | Kusuda |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0286458 A1 | 10/2013 | Lamine et al. |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1* | 12/2013 | Abramov .............. B23K 26/359 428/155 |
| 2013/0334185 A1 | 12/2013 | Nomaru |
| 2013/0340480 A1 | 12/2013 | Nattermann et al. |
| 2013/0344684 A1 | 12/2013 | Bowden |
| 2014/0023087 A1 | 1/2014 | Czompo |
| 2014/0027951 A1 | 1/2014 | Srinivas et al. |
| 2014/0034730 A1 | 2/2014 | Lee |
| 2014/0036338 A1 | 2/2014 | Bareman et al. |
| 2014/0042202 A1 | 2/2014 | Lee |
| 2014/0047957 A1 | 2/2014 | Wu |
| 2014/0076869 A1 | 3/2014 | Lee et al. |
| 2014/0083986 A1 | 3/2014 | Zhang et al. |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1 | 5/2014 | Fernando et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0182125 A1 | 7/2014 | Rozbicki et al. |
| 2014/0199519 A1* | 7/2014 | Schillinger .......... B23K 26/0006 428/155 |
| 2014/0216108 A1 | 8/2014 | Wiegel et al. |
| 2014/0238962 A1 | 8/2014 | Nawrodt et al. |
| 2014/0239034 A1 | 8/2014 | Cleary et al. |
| 2014/0239552 A1 | 8/2014 | Srinivas et al. |
| 2014/0290310 A1 | 10/2014 | Green |
| 2014/0291122 A1 | 10/2014 | Bando |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0352400 A1 | 12/2014 | Barrilado et al. |
| 2014/0361463 A1 | 12/2014 | Desimone et al. |
| 2015/0014891 A1 | 1/2015 | Amatucci et al. |
| 2015/0034612 A1 | 2/2015 | Hosseini et al. |
| 2015/0038313 A1* | 2/2015 | Hosseini ............ B23K 26/38 501/32 |
| 2015/0044445 A1 | 2/2015 | Garner et al. |
| 2015/0059986 A1* | 3/2015 | Komatsu ............ C03B 33/027 156/510 |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1* | 4/2015 | Hosseini ............ B23K 26/0617 428/846.9 |
| 2015/0121960 A1 | 5/2015 | Hosseini |
| 2015/0122656 A1 | 5/2015 | Hosseini |
| 2015/0136743 A1* | 5/2015 | Hosseini ............ B23K 26/082 219/121.61 |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Mattson et al. |
| 2015/0165548 A1* | 6/2015 | Marjanovic .......... B23K 26/02 428/43 |
| 2015/0165560 A1* | 6/2015 | Hackert .............. B23K 26/0608 428/43 |
| 2015/0165561 A1 | 6/2015 | Le et al. |
| 2015/0165562 A1* | 6/2015 | Marjanovic ........ B23K 26/0738 428/64.1 |
| 2015/0165563 A1* | 6/2015 | Manley ............ C03B 33/082 428/34 |
| 2015/0166391 A1* | 6/2015 | Marjanovic ............ C03B 33/07 428/43 |
| 2015/0166393 A1* | 6/2015 | Marjanovic ............ B23K 26/57 428/131 |
| 2015/0166394 A1* | 6/2015 | Marjanovic ............ C03B 33/082 428/43 |
| 2015/0166395 A1* | 6/2015 | Marjanovic ........ B23K 26/0613 428/131 |
| 2015/0166396 A1 | 6/2015 | Marjanovic et al. |
| 2015/0166397 A1* | 6/2015 | Marjanovic ........ B23K 26/53 65/112 |
| 2015/0183679 A1 | 7/2015 | Saito |
| 2015/0209922 A1 | 7/2015 | Yoshikawa |
| 2015/0232369 A1* | 8/2015 | Marjanovic ........ B23K 26/53 428/192 |
| 2015/0299018 A1 | 10/2015 | Bhuyan et al. |
| 2015/0311058 A1 | 10/2015 | Antsiferov et al. |
| 2015/0350991 A1 | 12/2015 | Sayadi et al. |
| 2015/0352671 A1 | 12/2015 | Darzi |
| 2015/0360991 A1 | 12/2015 | Grundmueller et al. |
| 2015/0362817 A1 | 12/2015 | Patterson et al. |
| 2015/0362818 A1 | 12/2015 | Greer |
| 2015/0367442 A1 | 12/2015 | Bovatsek et al. |
| 2016/0008927 A1 | 1/2016 | Grundmueller et al. |
| 2016/0009066 A1* | 1/2016 | Nieber ................ B23K 26/53 156/272.8 |

(56) References Cited

U.S. PATENT DOCUMENTS

| | | | |
|---|---|---|---|
| 2016/0009585 A1 | 1/2016 | Bookbinder et al. | |
| 2016/0016257 A1 | 1/2016 | Hosseini | |
| 2016/0023922 A1 | 1/2016 | Addiego et al. | |
| 2016/0031737 A1 | 2/2016 | Hoppe et al. | |
| 2016/0031745 A1 | 2/2016 | Ortner et al. | |
| 2016/0039044 A1 | 2/2016 | Kawaguchi | |
| 2016/0059359 A1 | 3/2016 | Krueger et al. | |
| 2016/0060156 A1 | 3/2016 | Krueger et al. | |
| 2016/0097960 A1 | 4/2016 | Dixit et al. | |
| 2016/0111380 A1 | 4/2016 | Sundaram et al. | |
| 2016/0138328 A1 | 5/2016 | Behmke et al. | |
| 2016/0152516 A1 | 6/2016 | Bazemore et al. | |
| 2016/0154284 A1 | 6/2016 | Sano | |
| 2016/0159679 A1 | 6/2016 | West | |
| 2016/0168396 A1 | 6/2016 | Letocart et al. | |
| 2016/0279895 A1 | 9/2016 | Marjanovic et al. | |
| 2016/0280580 A1 | 9/2016 | Bohme | |
| 2016/0282521 A1 | 9/2016 | Uchiyama et al. | |
| 2016/0290791 A1 | 10/2016 | Buono et al. | |
| 2016/0311717 A1 | 10/2016 | Nieber et al. | |
| 2016/0368100 A1 | 12/2016 | Marjanovic et al. | |
| 2017/0002601 A1 | 1/2017 | Bergh et al. | |
| 2017/0008791 A1 | 1/2017 | Kim et al. | |
| 2017/0052381 A1* | 2/2017 | Huang | B23K 26/073 |
| 2017/0169847 A1 | 6/2017 | Tamaki | |
| 2017/0183168 A1 | 6/2017 | Jia | |
| 2017/0197868 A1* | 7/2017 | Gupta | C03B 33/0222 |
| 2017/0225996 A1 | 8/2017 | Bookbinder et al. | |
| 2017/0229318 A1 | 8/2017 | Tsunetomo et al. | |
| 2017/0252859 A1 | 9/2017 | Kumkar et al. | |
| 2017/0355634 A1 | 12/2017 | Dumenil | |
| 2017/0368638 A1* | 12/2017 | Tayebati | B23K 26/0648 |
| 2018/0029919 A1 | 2/2018 | Schnitzler et al. | |
| 2018/0029920 A1 | 2/2018 | Marjanovic et al. | |
| 2018/0062342 A1 | 3/2018 | Comstock et al. | |
| 2018/0118602 A1* | 5/2018 | Hackert | C03B 33/0222 |
| 2018/0133837 A1 | 5/2018 | Greenberg et al. | |
| 2018/0134606 A1 | 5/2018 | Wagner et al. | |
| 2018/0186677 A1 | 7/2018 | Ito et al. | |
| 2018/0186678 A1 | 7/2018 | Boeker et al. | |
| 2018/0297887 A1 | 10/2018 | Spier et al. | |

FOREIGN PATENT DOCUMENTS

| | | |
|---|---|---|
| CN | 1473087 A | 2/2004 |
| CN | 1517313 A | 8/2004 |
| CN | 1573364 A | 2/2005 |
| CN | 1619778 A | 5/2005 |
| CN | 1735568 A | 2/2006 |
| CN | 1283409 C | 11/2006 |
| CN | 1890074 A | 1/2007 |
| CN | 1920632 A | 2/2007 |
| CN | 1930097 A | 3/2007 |
| CN | 101031383 A | 9/2007 |
| CN | 101043936 A | 9/2007 |
| CN | 101048255 A | 10/2007 |
| CN | 101386466 A | 3/2009 |
| CN | 101502914 A | 8/2009 |
| CN | 101595554 A | 12/2009 |
| CN | 101610870 A | 12/2009 |
| CN | 201357287 Y | 12/2009 |
| CN | 101622722 A | 1/2010 |
| CN | 101637849 A | 2/2010 |
| CN | 201471092 U | 5/2010 |
| CN | 101862907 A | 10/2010 |
| CN | 101965242 A | 2/2011 |
| CN | 101980982 A | 2/2011 |
| CN | 102046545 A | 5/2011 |
| CN | 102060437 A | 5/2011 |
| CN | 102105256 A | 6/2011 |
| CN | 102248302 A | 11/2011 |
| CN | 102272355 A | 12/2011 |
| CN | 102326232 A | 1/2012 |
| CN | 102343631 A | 2/2012 |
| CN | 102356049 A | 2/2012 |
| CN | 102356050 A | 2/2012 |
| CN | 102574246 A | 7/2012 |
| CN | 102596830 A | 7/2012 |
| CN | 102642092 A | 8/2012 |
| CN | 102649199 A | 8/2012 |
| CN | 102672355 A | 9/2012 |
| CN | 102674709 A | 9/2012 |
| CN | 102741012 A | 10/2012 |
| CN | 102898014 A | 1/2013 |
| CN | 102916081 A | 2/2013 |
| CN | 102923939 A | 2/2013 |
| CN | 102962583 A | 3/2013 |
| CN | 103013374 A | 4/2013 |
| CN | 103079747 A | 5/2013 |
| CN | 103086591 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103329035 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 105081564 A | 11/2015 |
| CN | 105164581 A | 12/2015 |
| CN | 105209218 A | 12/2015 |
| CN | 105246850 A | 1/2016 |
| CN | 103224117 B | 2/2016 |
| CN | 105392593 A | 3/2016 |
| CN | 105517969 A | 4/2016 |
| CN | 205328860 U | 6/2016 |
| CN | 106007349 A | 10/2016 |
| DE | 1020448 B | 12/1957 |
| DE | 2231330 A1 | 1/1974 |
| DE | 10322376 A1 | 12/2004 |
| DE | 102006042280 A1 | 6/2007 |
| DE | 10200635555 A1 | 1/2008 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 A1 | 5/2015 |
| DE | 102014213775 A1 | 1/2016 |
| DE | 102014116958 A1 | 5/2016 |
| DE | 102016102768 A1 | 8/2017 |
| EA | 004167 B1 | 2/2004 |
| EP | 0270897 A1 | 6/1988 |
| EP | 0609978 A1 | 8/1994 |
| EP | 0656241 A1 | 6/1995 |
| EP | 0938946 A1 | 9/1999 |
| EP | 0949541 A2 | 10/1999 |
| EP | 1043110 A2 | 10/2000 |
| EP | 1306196 A1 | 5/2003 |
| EP | 1159104 B1 | 8/2004 |
| EP | 1609559 A1 | 12/2005 |
| EP | 1990125 A1 | 11/2008 |
| EP | 2105239 A1 | 9/2009 |
| EP | 2133170 A1 | 12/2009 |
| EP | 2202545 A1 | 6/2010 |
| EP | 2258512 A1 | 12/2010 |
| EP | 2398746 A1 | 12/2011 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| EP | 3311947 A1 | 4/2018 |
| FR | 298294 A1 | 10/2013 |
| GB | 0768515 A | 2/1957 |

(56) References Cited

FOREIGN PATENT DOCUMENTS

| | | |
|---|---|---|
| GB | 1242172 | 8/1971 |
| GB | 2481190 A | 12/2011 |
| JP | 53-018756 A | 2/1978 |
| JP | 61-027212 A | 2/1986 |
| JP | 61-074794 A | 4/1986 |
| JP | 62-046930 A | 2/1987 |
| JP | 63-192561 A | 8/1988 |
| JP | 64-077001 A | 3/1989 |
| JP | 01-179770 A | 7/1989 |
| JP | 1179770 A | 7/1989 |
| JP | 05-274085 A | 10/1993 |
| JP | 05-300544 A | 11/1993 |
| JP | 06-082720 A | 3/1994 |
| JP | 06-318756 A | 11/1994 |
| JP | 6318756 A | 11/1994 |
| JP | 08-184581 A | 7/1996 |
| JP | 09-109243 A | 4/1997 |
| JP | 09106243 A | 4/1997 |
| JP | 11-197498 A | 7/1999 |
| JP | 11269683 A | 10/1999 |
| JP | 11-330597 A | 11/1999 |
| JP | 11-347861 A | 12/1999 |
| JP | 11347758 A | 12/1999 |
| JP | 2000-225485 A | 8/2000 |
| JP | 2000-327349 A | 11/2000 |
| JP | 2001-130921 A | 5/2001 |
| JP | 2001138083 A | 5/2001 |
| JP | 2001-179473 A | 7/2001 |
| JP | 2002-045985 A | 2/2002 |
| JP | 2002-205181 A | 7/2002 |
| JP | 2002-210730 A | 7/2002 |
| JP | 2002228818 A | 8/2002 |
| JP | 2002-321081 A | 11/2002 |
| JP | 2003-025085 A | 1/2003 |
| JP | 2003-088985 A | 3/2003 |
| JP | 2003062756 A | 3/2003 |
| JP | 2003114400 A | 4/2003 |
| JP | 2003154517 A | 5/2003 |
| JP | 2003-181668 A | 7/2003 |
| JP | 2003238178 A | 8/2003 |
| JP | 3445250 B2 | 9/2003 |
| JP | 2003-340579 A | 12/2003 |
| JP | 2004-182530 A | 7/2004 |
| JP | 2004209675 A | 7/2004 |
| JP | 2004-348137 A | 12/2004 |
| JP | 2005-000952 A | 1/2005 |
| JP | 2005104819 A | 4/2005 |
| JP | 2005-135964 A | 5/2005 |
| JP | 2005-144487 A | 6/2005 |
| JP | 2005-179154 A | 7/2005 |
| JP | 2005-219960 A | 8/2005 |
| JP | 2005205440 A | 8/2005 |
| JP | 2005-263623 A | 9/2005 |
| JP | 2005288503 A | 10/2005 |
| JP | 2006-108478 A | 4/2006 |
| JP | 3775250 B2 | 5/2006 |
| JP | 3775410 B2 | 5/2006 |
| JP | 2006130691 A | 5/2006 |
| JP | 2006-150385 A | 6/2006 |
| JP | 2006-182009 A | 7/2006 |
| JP | 2006-240948 A | 9/2006 |
| JP | 3823108 B2 | 9/2006 |
| JP | 2006248885 A | 9/2006 |
| JP | 2006-327711 A | 12/2006 |
| JP | 2007021548 A | 2/2007 |
| JP | 2007-196277 A | 8/2007 |
| JP | 2007253203 A | 10/2007 |
| JP | 2008-018547 A | 1/2008 |
| JP | 2008-132616 A | 6/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009056482 A | 3/2009 |
| JP | 2009-082958 A | 4/2009 |
| JP | 2009-084089 A | 4/2009 |
| JP | 2009-126779 A | 6/2009 |
| JP | 2009-142886 A | 7/2009 |
| JP | 2009-172633 A | 8/2009 |
| JP | 2009-178725 A | 8/2009 |
| JP | 2009-255114 A | 11/2009 |
| JP | 2009-269057 A | 11/2009 |
| JP | 2010-017990 A | 1/2010 |
| JP | 2010-042424 A | 2/2010 |
| JP | 4418282 B2 | 2/2010 |
| JP | 2010046761 A | 3/2010 |
| JP | 04592855 B2 | 12/2010 |
| JP | 2011-011212 A | 1/2011 |
| JP | 2011-037707 A | 2/2011 |
| JP | 2011049398 A | 3/2011 |
| JP | 2011-512259 A | 4/2011 |
| JP | 04672689 B2 | 4/2011 |
| JP | 2011-517299 A | 6/2011 |
| JP | 2011-517622 A | 6/2011 |
| JP | 2011-138083 A | 7/2011 |
| JP | 2011-520748 | 7/2011 |
| JP | 2011-147943 A | 8/2011 |
| JP | 2011-171334 A | 9/2011 |
| JP | 2011-240291 A | 12/2011 |
| JP | 04880820 B2 | 2/2012 |
| JP | 2012024782 A | 2/2012 |
| JP | 2012031018 A | 2/2012 |
| JP | 2012-517957 A | 8/2012 |
| JP | 2012159749 A | 8/2012 |
| JP | 2012-521889 | 9/2012 |
| JP | 2012187618 A | 10/2012 |
| JP | 2012-232894 A | 11/2012 |
| JP | 2012-528772 A | 11/2012 |
| JP | 2013007842 A | 1/2013 |
| JP | 2013031879 A | 2/2013 |
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-121908 A | 6/2013 |
| JP | 2013-521131 A | 6/2013 |
| JP | 2013-132664 A | 7/2013 |
| JP | 2013-136075 A | 7/2013 |
| JP | 2013-144613 A | 7/2013 |
| JP | 2013-528492 A | 7/2013 |
| JP | 2013-150990 A | 8/2013 |
| JP | 2013-168445 A | 8/2013 |
| JP | 05274085 B2 | 8/2013 |
| JP | 2013-536081 A | 9/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| JP | 2013-245153 A | 12/2013 |
| JP | 2014-001102 A | 1/2014 |
| JP | 2014-037006 A | 2/2014 |
| JP | 2014-104484 A | 6/2014 |
| JP | 2014-117707 A | 6/2014 |
| JP | 2014-156289 A | 8/2014 |
| JP | 2015-030040 A | 2/2015 |
| JP | 2015-076115 A | 4/2015 |
| JP | 2015-091606 A | 5/2015 |
| JP | 2015-129076 A | 7/2015 |
| JP | 2015-519722 A | 7/2015 |
| JP | 2015-536896 A | 12/2015 |
| JP | 2015-543336 | 2/2016 |
| JP | 2016-021077 A | 2/2016 |
| JP | 2016-513024 A | 5/2016 |
| JP | 2016-515085 A | 5/2016 |
| JP | 6061193 B2 | 1/2017 |
| KR | 10-2002-0031573 A | 5/2002 |
| KR | 2009057161 A | 6/2009 |
| KR | 10-2009-0107417 A | 10/2009 |
| KR | 2010-0120297 A | 11/2010 |
| KR | 10-2011-0001948 A | 1/2011 |
| KR | 1020621 B1 | 3/2011 |
| KR | 10-2011-0120862 A | 11/2011 |
| KR | 2011-0121637 A | 11/2011 |

(56) References Cited

FOREIGN PATENT DOCUMENTS

| | | |
|---|---|---|
| KR | 10-2012-0000073 A | 1/2012 |
| KR | 2012015366 A | 2/2012 |
| KR | 10-1120471 B1 | 3/2012 |
| KR | 2012074508 A | 7/2012 |
| KR | 2012-0102675 A | 9/2012 |
| KR | 2013-0031377 A | 3/2013 |
| KR | 2013031380 A | 3/2013 |
| KR | 10-1259349 B1 | 4/2013 |
| KR | 1269474 B1 | 5/2013 |
| KR | 10-2013-0075651 A | 7/2013 |
| KR | 2013-0079395 A | 7/2013 |
| KR | 10-2013-0111269 A | 10/2013 |
| KR | 2013124646 A | 11/2013 |
| KR | 10-2013-0135873 A | 12/2013 |
| KR | 10-2013-0140561 A | 12/2013 |
| KR | 1344368 B1 | 12/2013 |
| KR | 2014022980 A | 2/2014 |
| KR | 2014022981 A | 2/2014 |
| KR | 1020140064220 A | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201107253 A | 3/2011 |
| TW | 201139025 A | 11/2011 |
| TW | I362370 B | 4/2012 |
| TW | 201226345 A | 7/2012 |
| TW | 201311592 A | 3/2013 |
| TW | 201331136 A | 8/2013 |
| TW | 201339111 A | 10/2013 |
| TW | 201433550 A | 9/2014 |
| TW | 201436968 A | 10/2014 |
| TW | I468354 B | 1/2015 |
| TW | I520804 B | 2/2016 |
| TW | 201612615 A | 4/2016 |
| WO | 98/21154 A1 | 5/1998 |
| WO | 1999029243 A1 | 6/1999 |
| WO | 1999063900 A1 | 12/1999 |
| WO | 02/39063 A1 | 5/2002 |
| WO | 2003/007370 A1 | 1/2003 |
| WO | 2004110693 A1 | 12/2004 |
| WO | 2005/063645 A1 | 7/2005 |
| WO | 2006/017583 A2 | 2/2006 |
| WO | 2006073098 A1 | 7/2006 |
| WO | 2007094160 A1 | 8/2007 |
| WO | 2007/119740 A1 | 10/2007 |
| WO | 2008/012186 A1 | 1/2008 |
| WO | 2008/049389 A1 | 5/2008 |
| WO | 2008080182 A1 | 7/2008 |
| WO | 2008/102848 A1 | 8/2008 |
| WO | 2008/108332 A1 | 9/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2010035736 A1 | 4/2010 |
| WO | 2010/096359 A1 | 8/2010 |
| WO | 2010/111609 A2 | 9/2010 |
| WO | 2010/129459 A2 | 11/2010 |
| WO | 2011/025908 A1 | 3/2011 |
| WO | 2011056781 A1 | 5/2011 |
| WO | 2012006736 A2 | 1/2012 |
| WO | 2012/075072 A2 | 6/2012 |
| WO | 2012166753 A2 | 6/2012 |
| WO | 2012108052 A1 | 8/2012 |
| WO | 2013/016157 A1 | 1/2013 |
| WO | 2013022148 A1 | 2/2013 |
| WO | 2013043173 A1 | 3/2013 |
| WO | 2013/084877 A1 | 6/2013 |
| WO | 2013/084879 A1 | 6/2013 |
| WO | 2013138802 A1 | 9/2013 |
| WO | 2013150990 A1 | 10/2013 |
| WO | 2013153195 A1 | 10/2013 |
| WO | 2014/010490 A1 | 1/2014 |
| WO | 2014/012125 A1 | 1/2014 |
| WO | 2014/028022 A1 | 2/2014 |
| WO | 2014/058663 A1 | 4/2014 |
| WO | 2014/075995 A2 | 5/2014 |
| WO | 2014064492 A1 | 5/2014 |
| WO | 2014079478 A1 | 5/2014 |
| WO | 2014079570 A1 | 5/2014 |
| WO | 2014/085663 A1 | 6/2014 |
| WO | 2014/111385 A1 | 7/2014 |
| WO | 2014/111794 A1 | 7/2014 |
| WO | 2014/121261 A1 | 8/2014 |
| WO | 2014/132493 A1 | 9/2014 |
| WO | 2014/144322 A1 | 9/2014 |
| WO | 2014/161534 A2 | 10/2014 |
| WO | 2014/161535 A2 | 10/2014 |
| WO | 2015/077113 A1 | 5/2015 |
| WO | 2015/094898 A2 | 6/2015 |
| WO | 2015/095014 A1 | 6/2015 |
| WO | 2015/095088 A1 | 6/2015 |
| WO | 2015/095090 A1 | 6/2015 |
| WO | 2015/095146 A1 | 6/2015 |
| WO | 2015/095151 A2 | 6/2015 |
| WO | 2015/114032 A1 | 8/2015 |
| WO | 2015/128833 A1 | 9/2015 |
| WO | 2015/132008 A1 | 9/2015 |
| WO | 2015127583 A1 | 9/2015 |
| WO | 2016/007843 A1 | 1/2016 |
| WO | 2016/010991 A1 | 1/2016 |
| WO | 2016005455 A1 | 1/2016 |
| WO | 2016010954 A2 | 1/2016 |
| WO | 2016/079275 A1 | 5/2016 |
| WO | 2016/089799 A1 | 6/2016 |
| WO | 2016/100954 A1 | 6/2016 |
| WO | 2016154284 A1 | 9/2016 |
| WO | 2017/009149 A1 | 1/2017 |
| WO | 2017/079570 A2 | 5/2017 |
| WO | 2017/091529 A1 | 6/2017 |
| WO | 2017/093393 A1 | 6/2017 |

OTHER PUBLICATIONS

European Patent Application No. 20207645.1 Search Report and Search Opinion dated Jun. 14, 2021; 8 Pages; European Patent Office.
ICNIRP, Infrared Radiation, https://www.icnirp.org/en/frequencies/infrared/index.html#:~:text=Wavelength, accessed Apr. 7, 2021 (Year: 2014).
Liu,Xiuwen, "Graphical Audio-Visual Technology Tips", Apr. 30, 2006, pp. 58-59. (Original Document Only).
Tian e al., "Development status and Prospects of TFT-LCD Substrate Glass Chemical Composition", vol. 29, No. 6, 2010, pp. 1348-1362 (English Abstract Submitted).
"Aviation Manufacturing Technology"; Beijing Aviation Manufacturing Engineering Research Institute Aviation Industry Press; (2013) p. 147.
Amended claims 1 , 2 Amended Claims (Nov. 21. 2018) GMvp4 p. 1.
Analyse of claims 1-11 GMvP7 p. 1.
Betriebsanleitung TruMicro Series 5000, "Ausgabe May 2008 Betriebsanleitung TruMicro Series 5000_Anlage E2a-1.pdf".
Betriebsanleitung; TruMicro 5000; Aug. 2011; pp. 1-4.
Case Design Guidelines for Apple Devices; Sep. 13, 2013; pp. 1-58; Apple Inc.
Case study: Simulation einer Beschneidung des Femfelds eines Bessel-Gauß-Strahls GMvP6 p. 1.
Claim 1—published on Nov. 20, 2019 EP947: Anspruch 1—erteilt am 20. Nov. 2019 GMvp5 p. 1.
D5 Claims GMvP2 p. 1.
D6 Amended claim 1 EP947: Anspruch 1—geandert am 21. Nov. 2018 GMvp3 p. 1.
EagleEtch; TheAnti-glare Glass for Technical Display Applications; Glass and Polymer Technologies; pp. 1-8; EuropTec USA Inc.

(56) References Cited

OTHER PUBLICATIONS

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
European Patent Application No. 17794864.3 Communication under Rule 71(3) EPC dated Jul. 15, 2020; 6 Pages; European Patent Office.
European Patent Application No. 17794864.3 Office Action dated Jan. 30, 2020; 3 Pages; European Patent Office.
Faccio et al. "Kerr-induced spontaneous Bessel beam formation in the regime of strong two-photon absorption" Optics Express 16(11) 2008, pp. 8213-8218.
Flamm et al., "Higher-order Bessel-like Beams for Optimized Ultrafast Processing of Transparent Materials" GMvP 19.
Flamm et al., "Higher-order Bessel-like Beams for Optimized Ultrafast Processing of Transparent Materials" GMvP 20.
Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.
GT ASF Grown Sapphire Cover and Touch Screen Material; wvvw.gtat.com, 2012; pp. 1-2; GTAT Corporation.
High aspect ratio machining . . . Anlage E8-1.pdf.
Jonas Weiss, et al., "Optical Interconnects for Disaggregated Resources in Future Datacenters", ECOC 2014, Cannes-France, 3 pgs.
Kerr. "Filamentary tracks formed in transparent optical glass by laser beam self-focusing. II. Theoretical Analysis" Physical Review A., 4(3) 1971, pp. 1196-1218.
Merkmalsgliederung Patentanspruch 1 des Streitpatents, "Merkmalsgliederung Patentanspruch 1 _Anlage E15-1.pd1".
Merkmalsgliederung Patentanspruch 12 des Streitpatents,"Merkmalsgliederung Patentanspruch 12 _Anlage E16-1.pdf".
Norm: DI N EN ISO 11146-2, 2005 DIN EN ISO 11146-2 May 2, 2005 GMvP 21 pages.
Norm: DIN EN ISO 11146-1, 2005 GMvP DIN EN ISO 11146:1999-09 Apr. 1, 2005 GMvP 23 pages.
Norm: ISO/TR 11146-3 , Technical Report First edition GMvP Norm-TR 1 Pages.
Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).
Product Data Sheet for Corning Eagle XG Slim Glass, Issued Aug. 2013; 2 Pages.
Product data sheet for Corning Eagle XR glass substrate, issued Jan. 2006 (Year: 2006).
Produktbeschreibung Pharos Laser vom Apr. 18, 2011, "Pharos_2011 Anlage E 1 a-1. pdf".
U.S. Appl. No. 62/208,282, filed Aug. 21, 2015.
Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).
Japanese Patent Application No. 2019-521647, Office Action dated Jul. 16, 2021, 7 pages (4 pages of English Translation and 3 pages of Original Document), Japanese Patent Office.
Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.
Chinese Patent Application No. 201780065972.0, Office Action dated Jun. 2, 2021; 14 pages (English Translation only); Chinese Patent Office.
McGloin et al."Bessel beams: diffraction in a new light" Contemporary Physics, vol. 46 No. 1 (2005) pp. 15-28.
Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003), doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses" Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920, Published: Jul. 1939.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. Of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

(56) References Cited

OTHER PUBLICATIONS

"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 7728 77281V-1, published Jun. 2010.
Bhuyan et al. "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance" Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.

Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654, published Apr. 1987.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps" SPIE vol. 2991, 0277-786X/97, pp. 40-47, published May 1997.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
Sukumaran, "Through-Package-Via Formation and Metallization of Glass Interposers.", Electronic Components and Technology Conference: 557-563, (2010).

(56) References Cited

OTHER PUBLICATIONS

Tymon Barwicz, et al., "Assembly of Mechanically Compliant Interfaces between Optical Fibers and Nanophotonic Chips", Tymon Barwicz (IBM), et al., Electronic Components & Technology Conference, 2014, . 978-1-4799-2407-3, 2014 IEEE, pp. 179-185.
U.S. Appl. No. 62/137,443, "Laser Cutting and Processing of Display Glass Compositions", filed Mar. 24, 2015., U.S. Appl. No. 62/137,443.
Chinese Patent Application No. 201780065972.0, Office Action dated Apr. 15, 2022, 14 pages (6 pages of English Translation and 8 pages of Original Document), Chinese Patent Office.

* cited by examiner

SUBSTRATE PROCESSING STATION FOR LASER-BASED MACHINING OF SHEET-LIKE GLASS SUBSTRATES

This application claims the benefit of priority under 35 U.S.C. § 119 of U.S. Provisional Application Ser. No. 62/411,938, filed on Oct. 24, 2016, the content of which is relied upon and incorporated herein by reference in its entirety.

FIELD

This disclosure relates to methods and apparatuses for machining sheet-like substrates and, more particularly, to substrate processing stations for laser-based machining of sheet-like glass substrates.

BACKGROUND

Various methods and apparatuses for severing glass sheets are known. One illustrative method employs lasers, which by virtue of wavelength and power that are strongly absorbed by the glass material, or after the first interaction make the material strongly absorbent, can then ablate the material. Another method is a specifically directed, laser-induced crack formation in which a trace on the surface is first strongly heated by the laser and immediately thereafter, this trace is cooled quickly (e.g., by a water jet) such that the thermal stresses thereby achieved lead to crack formation, which may be propagated through the thickness of the material (mechanical stress) in order to sever the material.

In some known cutting processes, a glass cutting apparatus including X/Y (sometimes referred to as 2D) positioning tables may be used. For example, a carrier may be used to transport the glass sheet between processing locations. The X/Y positioning table of the glass cutting apparatus may be mounted with the carrier and the glass sheet located thereon. The carrier may then by moved by linear actuators in both X and Y directions in a horizontal plane while a stationary process head including a laser directs a laser beam onto the glass sheet for the cutting operation.

While the above-described process may be suitable for cutting the glass sheet, the handling of the individual glass sheets on carriers can be time-consuming and can be less suitable for higher volume operations. The scrap from the cutting operation typically remains on the carriers thereby introducing another step where the scrap must be removed from the carrier.

SUMMARY

An object of the present invention is therefore to provide a method (and a corresponding device) with which sheet-like substrates, in particular of brittle materials, can be machined, in particular completely severed, without significant particle formation, without significant melt edges, with minimal crack formation at the edge, without significant cutting gaps (that is to say material losses), with straightest-possible cut edges and with a high speed of the process.

In one embodiment, a glass sheet processing apparatus includes a first gantry assembly that extends across a glass sheet in a cross-machine direction. The first gantry assembly includes a processing head that moves along a length of the first gantry assembly and includes a laser comprising an optical arrangement positioned in a beam path of the laser providing a laser beam focal line that is formed on a beam output side of the optical arrangement. A second gantry assembly extends across the glass sheet in the cross-machine direction. The second gantry assembly includes a processing head that moves along a length of the second gantry assembly.

In another embodiment, a method for laser-based machining of a sheet-like substrate, in order to separate the substrate into multiple portions, in which the laser beam of a laser for machining the substrate is directed onto the substrate is provided. The method includes processing the sheet-like substrate using a first gantry assembly that extends across the sheet-like substrate in a cross-machine direction. The first gantry assembly includes a processing head that moves along a length of the first gantry assembly and includes a laser including an optical arrangement positioned in a beam path of the laser providing a laser beam focal line that is formed on a beam output side of the optical arrangement. The sheet-like substrate is processed using a second gantry assembly that extends across the sheet-like substrate in the cross-machine direction. The second gantry assembly includes a processing head that moves along a length of the second gantry assembly.

In another embodiment, a glass sheet processing apparatus includes a gantry assembly that extends across a glass sheet in a cross-machine direction. The gantry assembly includes multiple processing heads that move along a length of the gantry assembly in the cross-machine direction. A first processing head includes a laser that separates the glass sheet into multiple portions including an optical arrangement positioned in a beam path of the laser providing a laser beam focal line that is formed on a beam output side of the optical arrangement.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments described herein relate generally to glass sheet transfer apparatuses suitable for use with laser-based machining of sheet-like glass substrates. The glass sheet transfer apparatuses may be part of a glass sheet processing apparatus that generally includes one or more of a glass sheet loading station that is used to load the glass sheets into the glass sheet processing apparatus, a glass sheet centering station that is used to position the glass sheet in the cross machine direction, a glass sheet processing station where cutting tools (e.g., lasers) are used in cutting the glass sheet, a glass unloading station where desired parts are removed from the undesired scrap and a glass waste disposal station where remaining glass scrap is processed to reduce the size of the undesired scrap and deposit the crushed scrap in a holding location.

Figure 1:
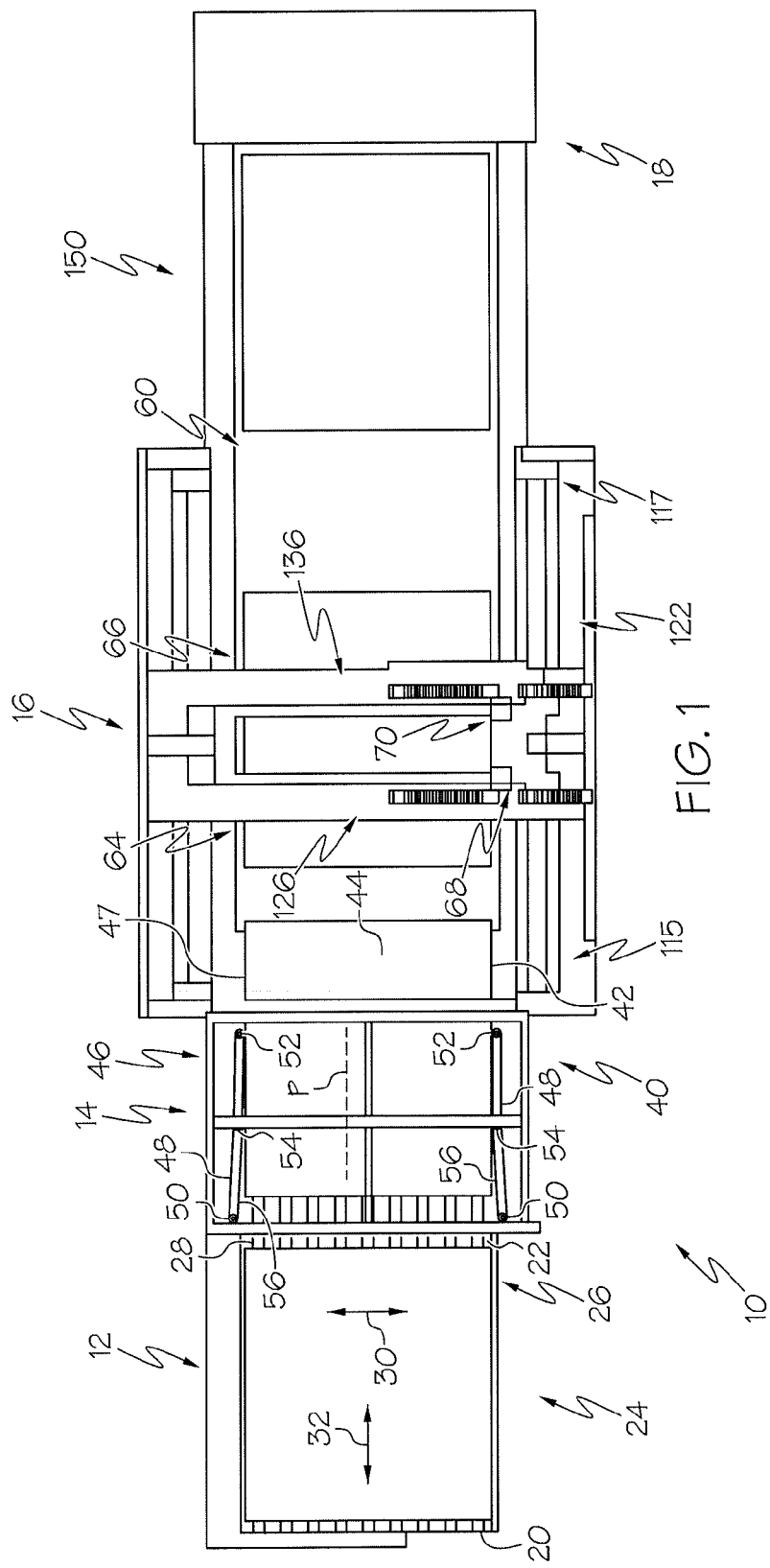
FIG. 1 illustrates diagrammatic plan view of a glass sheet processing apparatus suitable for use with laser-based machining of sheet-like substrates, according to one or more embodiments shown and described herein.

Referring to FIG. 1, a glass sheet processing apparatus 10 according to one or more embodiments is shown. The glass sheet processing apparatus 10 includes a glass sheet loading station 12, a glass sheet centering station 14, a glass sheet processing station 16 and a glass waste disposal station 18. The glass sheet loading station 12 is of a tilting table configuration having an infeed end 20 and an outfeed end 22. The glass sheet loading station 12 may include a table support body 24 that includes an array 26 of conveyor belts 28 that together define a support surface for a glass sheet 44 supported thereon. The conveyor belts 28 may be spaced apart in the cross machine direction (indicated by arrow 30) any distance that is suitable to transport the glass sheets, yet inhibit contact between adjacent belts 28 during use.

The table support body 24 may have a loading configuration and a transfer configuration. In the loading configuration, the infeed end 20 of the table support body 24 can be lowered (e.g., closer to a floor or other infeed device) using an actuator (e.g., a pneumatic actuator, motor, etc.) where a glass sheet can be readily fed onto the support surface that is defined by the conveyor belts 28. The conveyor belts 28 may be used to pull the glass sheet onto the table support body 24 through their movement in the machine direction (indicated by arrow 32) at a predetermined velocity. Once the glass sheet 14 is on the table support body 24, the infeed end 20 may be raised such that the infeed end 20 and the outfeed end 22 are at substantially the same elevation and the support surface is substantially horizontal for feeding the glass sheet from the glass sheet loading station 12 to the glass sheet centering station 14 using the conveyor belts 28. In some embodiments, the infeed end 20 may remain substantially horizontal throughout the glass sheet infeed process and may not be lowered and raised.

In the illustrated embodiment, the glass sheet centering station 12 may include a first side position adjustment mechanism 40 located at one side edge 42 of glass sheet 44 and a second side position adjustment mechanism 46 located at an opposite side edge 47 of the glass sheet 44. The first and second side position adjustment mechanisms 40 and 46 include an adjustment belt 48 that is trained about end drive rollers 50 and 52 and a central belt positioning roller 54. The central belt positioning rollers 54 are located inboard toward a centerline of the drive path P from the upstream end drive rollers 20, which creates a tapered region 56 of the first and second side position adjustment regions 40 and 46. The tapered regions 56 decrease the available width of the drive path P, which can adjust the cross-machine location of the glass sheet 44 to a desired location right before the glass sheet 44 is received by a glass holding conveyor belt 60 for laser processing.

The glass holding conveyor belt 60 can carry the glass sheet 44 through the glass sheet processing station 16. The glass sheet processing station 16 may be a multi-gantry type including at least two gantry assemblies 64 and 66 that are arranged substantially parallel to each other, extending in the cross machine direction. The gantry assemblies 64 and 66 may be controlled by a controller to move independently along the glass sheet processing station 16 in the machine direction 32. Movement of the gantry assemblies 64 and 66 may be dictated by dimensions and numbers of the parts being machined from the glass sheet 44. As will be described in greater detail below, each gantry assembly 64 and 66 may include one or more processing head 68 and 70 that are moveable linearly in the cross machine direction 30 and each include a respective laser cutting device that can be used to sever sections of the glass sheet 44 from another. The linear movement of the gantry assemblies 64 and 66 in the machine direction 30 and the linear movement of the processing heads 68 and 70 in the cross machine direction 32 allow for cutting the glass sheet 44 into various complex and non-complex shapes, depending on the needs of the end product. Further the processing heads 68 and 70 may work together for cutting through the glass sheet 44 in a multi-stage cutting process.

Figure 2:
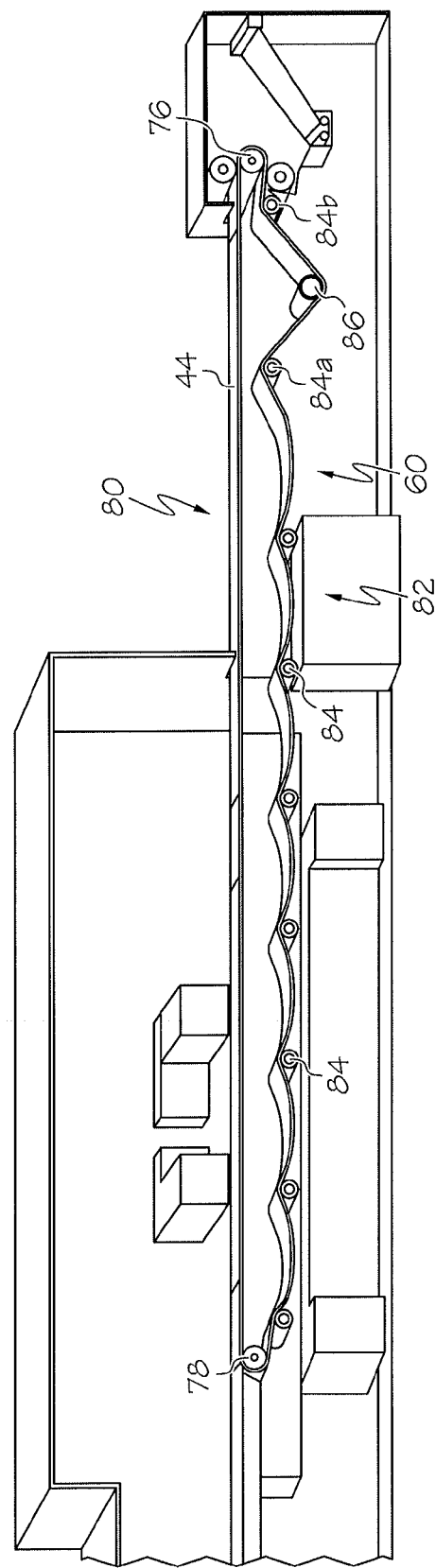
FIG. 2 illustrates a side section view of the glass sheet processing apparatus of FIG. 1.

Referring to FIG. 2, the glass holding conveyor belt 60 extends between a downstream drive roller 76 and an upstream drive roller 78 in a continuous loop defining a conveying portion 80 that conveys the glass sheets 44 downstream and a return portion 82 that travels toward the upstream drive roller 78. As illustrated by FIG. 2, the glass holding conveyor belt 60 is held relatively taught at the conveying portion 80 to provide a substantially flat support surface for the glass sheets 44. This is compared to the return portion 82, which is held relatively slack, allowing the return portion 82 to rest upon idle support rollers 84 as the return portion 82 of the glass holding conveyor belt 60 travels toward the upstream drive roller 78. A tension roller 86 may be provided between idle support rollers 84a and 84b immediately adjacent the downstream drive roller 76 to maintain a consistent tension for the glass holding conveyor belt 60 to exit the conveying portion 80 into the return portion 82, about the downstream drive roller 76. The downstream drive roller 76 and upstream drive roller 78 may each be connected to a motor to drive the glass holding conveyor belt 60 in a continuous fashion. In some embodiments, only the downstream drive roller 76 may be driven by a motor.

Figure 3:
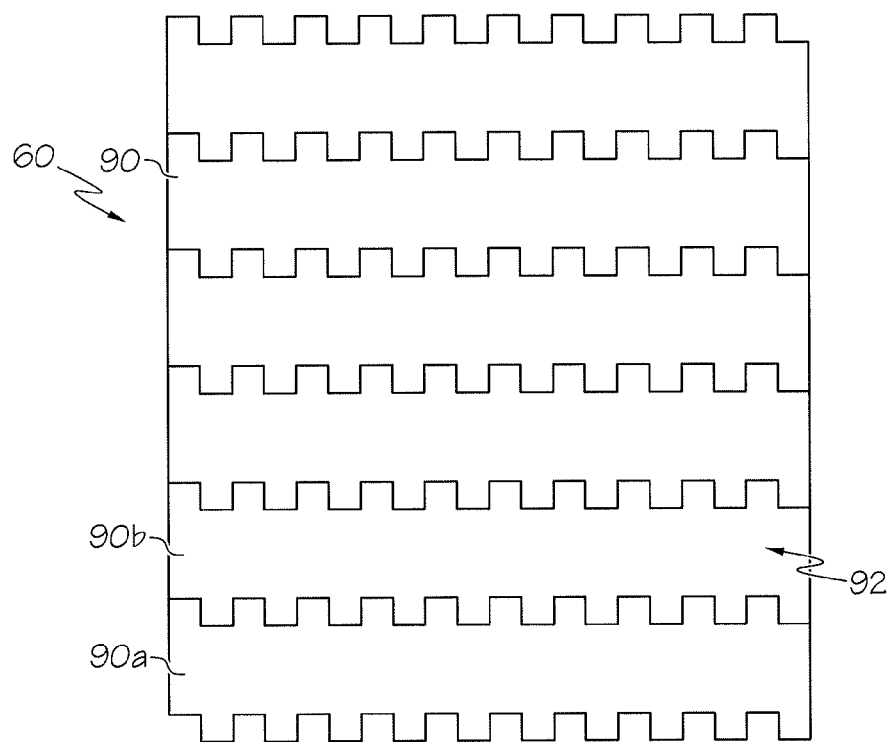
FIG. 3 illustrates a portion of a glass holding conveyor belt for use with the glass sheet processing apparatus of FIG. 1, according to one or more embodiments shown and described herein.
Figure 4:
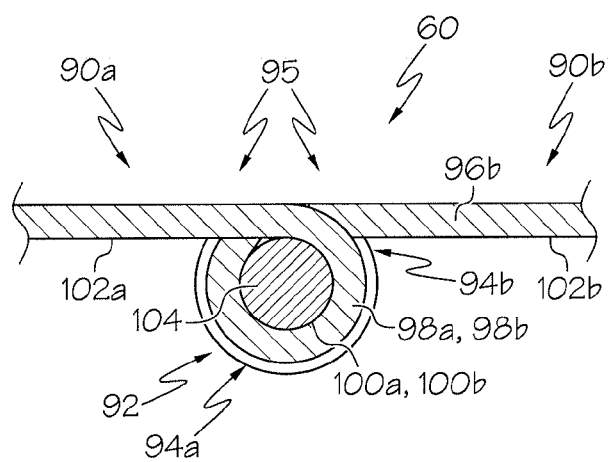
FIG. 4 illustrates another view of the glass holding conveyor belt along line 4-4 of FIG. 3.
Figure 5:
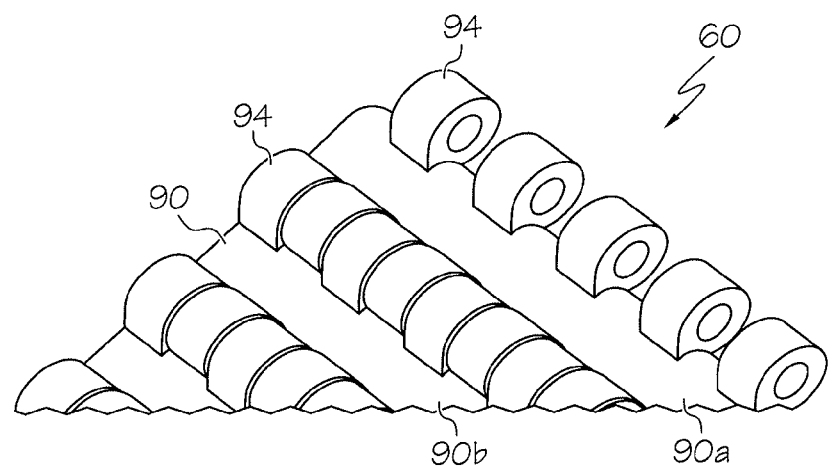
FIG. 5 illustrates another view of the glass holding conveyor belt of FIG. 3.

Referring to FIG. 3, a portion of the glass holding conveyor belt 60 is shown and includes conveyor belt segments 90 that are interconnected to provide the continuous glass holding conveyor belt 60. The conveyor belt segments 90a and 90b may be connected along joint lines 92 that allow for articulating (e.g., rotating) movement between the conveyor belt segments 90a and 90b relative to one another. Referring briefly to FIG. 4, conveyor belt segment 90a may include interlocking members 94a in the form of integrally formed loop members that extend outwardly from a substantially planar support portion 96a and form a loop portion 98a with an opening 100a by extending back toward an underside 102a of the conveyor belt segment 90a. Likewise, the conveyor belt segment 90b may include interlocking members 94b in the form of integrally formed loop members that extend outwardly from a substantially planar support portion 96b and form a loop portion 98b with an opening 100b by extending back toward an underside 102b of the conveyor belt segment 90b. The interlocking members 94a and 94b may engage in a side-by-side arrangement with their openings 100a and 100b aligned and sized to receive a connecting rod 104 therethrough, which allows movement of the conveyor belt segments 90a and 90b in the direction of arrow 95 while inhibiting separation of the conveyor belt segments 90a and 90b. As shown by FIG. 5, a number of the interlocking members 94 of adjacent conveyor belt segments 90 are positioned side by side in a row to receive the connecting rod 104 in a rotatable fashion. Each conveyor belt segment 90 may be connected in the same fashion providing the glass holding conveyor belt 60 with a relatively high degree of articulation and ability to remove/replace sections of the glass holding conveyor belt.

Figure 6:
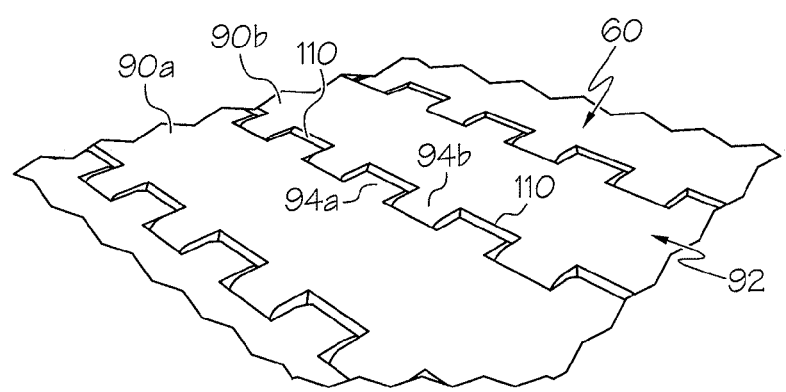
FIG. 6 illustrates another view of the glass holding conveyor belt of FIG. 3.

Referring to FIG. 6, a series of vacuum openings 110 are provided along each joint line 92 due to the interconnections between and sizes of the interlocking members 94a and 94b. The vacuum openings 110 are provided through the thickness of the glass holding conveyor belt 60 and follow an air flow path through the interconnections between the interlocking members 94a and 94b to allow negative pressure generated below the glass holding conveyer belt 60 to draw air through the vacuum openings 110. In some embodiments, a negative pressure of up to 280 millibar or more may be generated. This negative pressure may be used to hold the glass sheets 44 against the glass holding conveyor belt 60 and inhibit movement of the glass sheets 44 as they travel in the machine direction 32.

The glass holding conveyor belt 60 may be formed of any material that is suitable for contacting the high-quality glass sheets 44. As one example, polyoxymethylene C (POM C) may be used due to its suitability to contact the glass sheets 44 and thermal resistance during the laser cutting process. The natural color of POM C (no added color ingredients) is white, which reduces any interference with the laser and can reduce the amount of process residue on the parts produced from the glass sheets 44. POM C can also be suitable for a wide range of laser processes.

Figure 7:
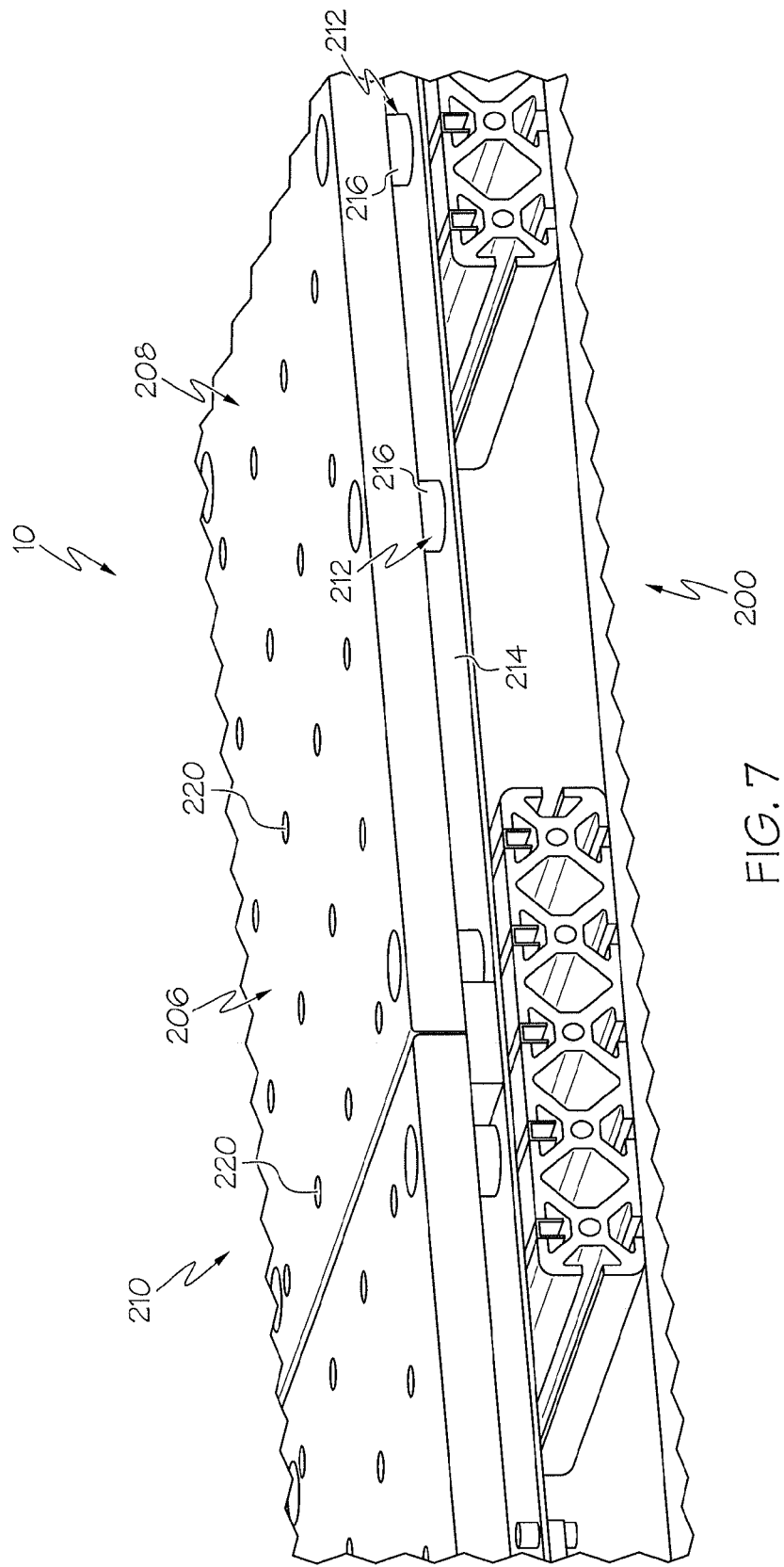
FIG. 7 is a section view of the glass sheet processing apparatus of FIG. 1 with a glass holding conveyor belt removed, according to one or more embodiments shown and described herein.

Referring to FIG. 7, a section view of the glass sheet processing apparatus 10 is illustrated with the glass holding conveyor belt 60 removed for clarity. The glass holding conveyor belt is supported by a vacuum support apparatus 200. The vacuum support apparatus 200 supports the glass holding conveyor belt 60 against a conveyor support surface 206 as the glass holding conveyor belt 60 is being conveyed. The conveyor support surface 206 is provided by a plurality of worktable support sections 208 that are aligned together in both the machine longitudinal and machine lateral directions to define a substantially planar worktable assembly 210 that includes the conveyor support surface 206 arranged substantially horizontally. The individual worktable support sections 208 may be formed as plates that, in the illustrated embodiment, are rectangular, but may be any suitable shape that are shaped to fit together in a side-by-side arrangement.

The worktable support sections 208 may be aligned both vertically and horizontally using height adjustment spacer assemblies 212. The height adjustment spacer assemblies 212 may include spacer members 216 that are positioned between an individual worktable support section 208 and a vacuum chamber floor 214. The spacer members 216 may be substantially the same height to align the worktable support sections 208 vertically to provide the substantially planar conveyor support surface 206. The height adjustment spacer assemblies 212 may also provide a vacuum chamber volume 218 that is provided between the vacuum chamber floor 214 and the worktable assembly 210.

Each worktable support section 208, while used to support the glass holding conveyor belt 60 as the glass holding conveyor belt 60 moves relative to the worktable support assembly 210, also facilitates application of a negative pressure along lengths of the glass holding conveyor belt 60. In particular, the worktable support sections 208 include vacuum openings 220 that are provided through thicknesses of the worktable support sections 208. In some embodiments, the vacuum openings 220 of each worktable support section 208 may be aligned in both rows and columns to provide an array of the vacuum openings 220 that is spread across areas of the conveyor support surface 206. The vacuum openings 220 provide communication passageways through the worktable support sections 208 for negative pressure to be applied to the glass holding conveyor belt 60 from the vacuum chamber volume 218.

Positively holding the glass sheet 44 against the glass holding conveyor belt 60 can allow for improved handling of the glass sheet 44, such as maintaining position of the glass sheet 44 on the glass holding conveyor belt 60 during relatively high conveyor belt accelerations and decelerations (e.g., at least about 2 m/s$^2$, such as at least about 5 m/s$^2$) in the machine direction and for relatively fast transfer rates of the glass sheets 44 onto the glass holding conveyor belt 60 (e.g., at least about 1 m/s) with relatively low tact time (e.g., about 3 to 7 seconds).

Referring again to FIG. 1, as indicated above, the glass sheet processing station 16 may be multi-gantry type that includes at least two gantry assemblies 64 and 66 that are arranged substantially parallel to each other, extending in the cross machine direction between side edges 42 and 48 of the glass sheet 44. The gantry assemblies 64 and 66 may move independently along the glass sheet processing station 16 in the machine direction 32 along track assembly 122 using linear motors 115 and 117. Each gantry assembly 64 and 66 may include one or more processing heads 68 and 70 that are moveable linearly in the cross machine direction 30 along track assemblies 126 and 136 provided by the gantry assemblies 64 and 66 and each include the respective laser cutting device that can be used to sever sections of the glass sheet 44 from another.

The glass sheet 44 may be transferred onto the glass holding conveyor belt 60 of the glass sheet processing station 16 for laser processing (e.g., cutting) of the glass sheet 44 using lasers of the processing heads 68 and 70. Generally, the laser processing may perforate the glass sheet 44 that is transparent to the laser, sometimes referred to herein as the "transparent material," and the perforation may cause or contribute to cutting the transparent material at the perforation. The laser processing may be used to separate portions of the glass sheet 44 to form a desired shape. The general mechanism of separating the substrate into individual parts is described below.

The separating method of the glass sheet processing apparatus 10 produces for each laser pulse a laser focal line (as distinct from a focal point) using laser optics suitable therefor (hereinafter also referred to as an optical arrangement). The focal line determines the zone of the interaction between the laser and the material of the glass sheet 44. If the focal line falls in the material to be separated, the laser parameters can be chosen such that an interaction with the material which produces a crack zone along the focal line takes place. Important laser parameters are the wavelength of the laser, the pulse duration of the laser, the pulse energy of the laser and possibly also the polarization of the laser. The following can be provided for the interaction of the laser light with the material:

1) The wavelength of the laser can be chosen such that the material of the glass sheet 44 is substantially transparent at this wavelength (specifically for example: absorption $<<10\%$ per mm of material depth$\Rightarrow \gamma <<1/cm$; $\gamma$: Lambert-Beer absorption coefficient).

2) The pulse duration of the laser can be chosen such that no significant heat transport (heat diffusion) out of the zone of interaction can take place within the time of interaction (specifically for example: $\tau << d^2/\alpha$, d: focus diameter, $\tau$: laser pulse duration, $\alpha$: heat diffusion constant of the material).

3) The pulse energy of the laser can be chosen such that the intensity in the zone of interaction, that is to say in the focal line, produces an induced absorption, which leads to local heating of the material of the glass sheet 44 along the focal line, which in turn leads to crack formation along the focal line as a result of the thermal stress introduced into the material.

4) The polarization of the laser influences both the interaction at the surface (reflectivity) of the glass sheet 44 and the type of interaction within the material in the induced absorption. The induced absorption may take place by way of induced, free charge carriers (typically electrons), either after thermal excitation, or by way of multiphoton absorption and internal photoionization, or by way of direct field ionization (field strength of the light breaks electron bonding directly). The type of generation of the charge carriers can be assessed for example by way of the so-called Keldysh parameter. In the case of certain materials (for example birefringent materials) it may just be important that the further absorption/transmission of the laser light depends on the polarization, and consequently the polarization by way of suitable optics (phase plates) should be chosen by the user to be conducive for separating the respective material, for example simply in a heuristic way. Therefore, if the material is not optically isotropic, but for example birefringent, the propagation of the laser light in the material is also influenced by the polarization. Thus, the polarization and the orientation of the polarization vector may be chosen such that, as desired, there only forms one focal line and not two (ordinary and extraordinary rays). In the case of optically isotropic materials, this does not play any role.

5) Furthermore, the intensity should be chosen on the basis of the pulse duration, the pulse energy and the focal line diameter such that there is preferably no significant ablation or significant melting, but preferably only crack formation in the microstructure of the solid body. For typical materials such as glass or transparent crystals, this requirement can be satisfied most easily with pulsed lasers in the sub-nanosecond range, that is to say in particular with pulse durations of for example between 10 and 100 ps.

The process for the crack formation in the material occurring, and made to extend vertically to the plane of the glass sheet 44, is mechanical stress that exceeds the structural strength of the material (compressive strength in MPa). The mechanical stress is achieved here by way of rapid, inhomogeneous heating (thermally induced stress) by the laser energy. Presupposing appropriate positioning of the glass sheet 44 in relation to the focal line, the crack formation starts at the surface of the glass sheet 44, since that is where the deformation is greatest. The reason for this is that in the half-space above the surface there is no material that can absorb forces. This argument also applies to materials with hardened or toughened surfaces, as long as the thickness of the hardened or toughened layer is great in comparison with the diameter of the abruptly heated material along the focal line.

The type of interaction can be set by way of the fluence (energy density in Joules per $cm^2$) and the laser pulse duration with a selected focal line diameter such that, in some embodiments, 1.) no significant melting takes place at the surface or in the volume and 2.) no significant ablation with particle formation takes place at the surface. In the substantially transparent materials, several types of induced absorption are known:

a) In semiconductors and isolators with a low band gap, on the basis for example of a low residual absorption (due to traces of impurities in the material or due to charge carriers already thermally excited at the temperature before the laser machining), rapid heating up within a first fraction of the laser pulse duration will lead to thermal excitation of further charge carriers, which in turn leads to increased absorption and consequently to a cumulative increase in the laser absorption in the focal line.

b) In isolators, if there is sufficiently high light intensity, a photo absorption leads to an ionization on the basis of a nonlinear-optical interaction with the atoms of the material, and consequently in turn to the generation of free charge carriers, and consequently to increased linear absorption of the laser light.

The production of the geometry of a desired separating surface (relative movement between the laser beam of one of the processing heads 68 and 70 and the substrate of the glass holding conveyor belt 60 along a line on the substrate surface) is described below.

The interaction with the glass sheet 44 produces for each laser pulse an individual, continuous (seen in the direction perpendicular to the substrate surface) crack zone in the material along a focal line. For the complete severing of the material, a series of these crack zones for each laser pulse is set so close together along the desired separating line that a lateral connection of the cracks produces a desired crack surface/contour in the material. For this, the laser is pulsed at a specific repetition rate. The spot size and spacing are chosen such that a desired, directed crack formation occurs at the surface, along the line of the laser spots. The spacing of the individual crack zones along the desired separating surface is obtained from the movement of the focal line in relation to the material within the time period from laser pulse to laser pulse.

To produce the desired separating surface in the material of the glass sheet 44, the pulsed laser light is moved over the material by an optical arrangement that is movable parallel to the plane of the glass sheet 44 such that the desired separating line is formed. The orientation of the focal line in relation to the surface of the glass sheet 44, whether perpendicular or at an angle to the surface, may either be chosen as a fixed value or be changed by way of a pivotable optical arrangement (hereinafter also referred to for simplicity as optics) and/or a pivotable beam path of the laser along the desired separating line.

Altogether, for forming the desired separating line, the focal line may be passed through the material in up to five separately movable axes: two spatial axes (x, y), which fix the point of penetration of the focal line into the material, two angular axes (theta, phi), which fix the orientation of the focal line from the point of penetration into the material, and a further spatial axis (z', not necessarily orthogonal to x, y), which fixes how deep the focal line reaches into the material from the point of penetration at the surface.

There are generally restrictions here, dictated by the optics and the laser parameters: the orientation of the angles in theta and phi can only take place to the extent that the refraction of the laser light in the material allows (less than the angle of total reflection in the material), and the depth of penetration of the laser focal line is restricted by the available laser pulse energy and the accordingly chosen laser optics, which only forms a length of the focal line that can produce the crack zone with the laser pulse energy available.

The separation of the material along the crack surface/contour produced takes place either by internal stress of the material or by forces introduced, for example mechanically (tension) or thermally (uneven heating/cooling). Since, no significant amount of material may be ablated, there is generally initially no continuous gap in the material, but only a highly disturbed fracture surface area (microcracks), which is meshed within itself and under some circumstances still connected by bridges. The forces subsequently introduced have the effect of separating the remaining bridges and overcoming the meshing by way of lateral crack growth (taking place parallel to the plane of the substrate), so that the material can be separated along the separating surface.

Figure 8:
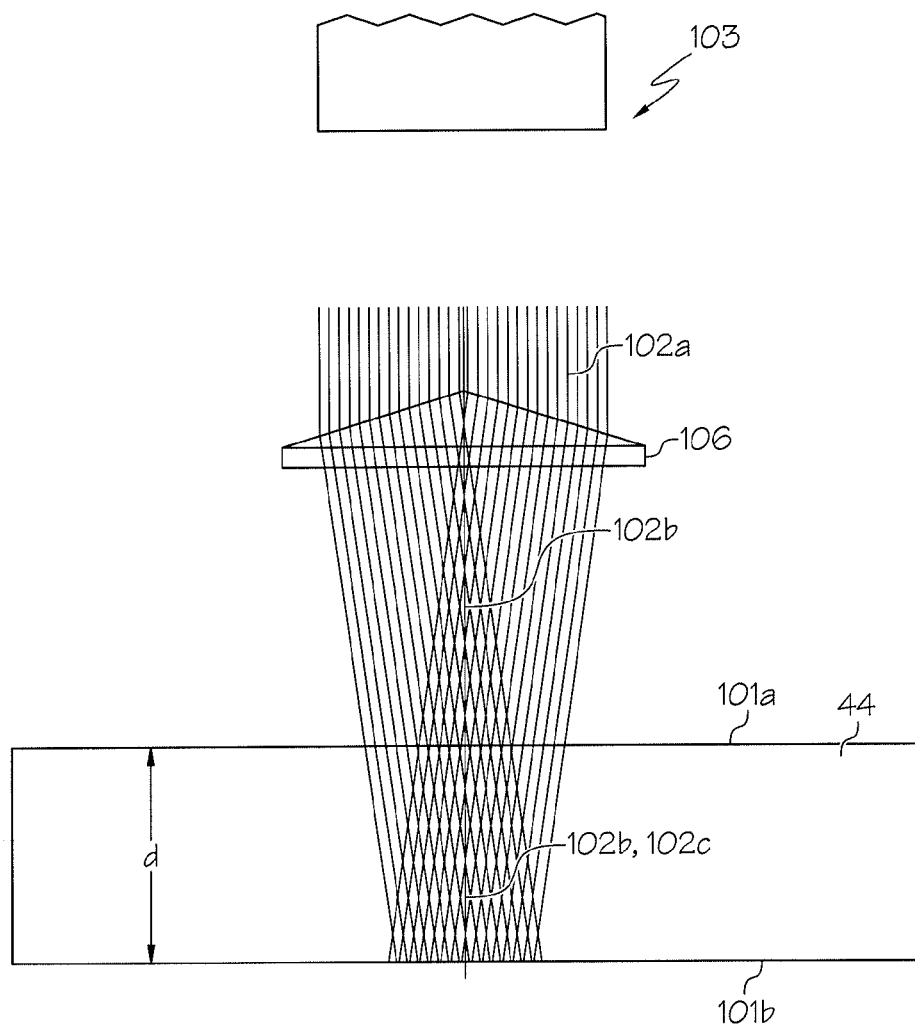
FIG. 8 illustrates an optical arrangement of a laser for use with the glass sheet processing apparatus of FIG. 1, according to one or more embodiments shown and described herein.

Referring to FIG. 8, a method for the laser-based machining of the glass sheet 44, in order to separate the substrate into multiple parts, in which the laser beam 102*a*, 102*b* of a laser 103 for machining the glass sheet 44 is directed onto the latter, is characterized in that with an optical arrangement 106 positioned in the path of rays of the laser 103, an extended laser beam focal line 102*b*, seen along the direction of the beam, is formed on the beam output side of the optical arrangement 106 from the laser beam 102*a* directed onto the latter, the glass sheet 44 being positioned in relation to the laser beam focal line 102*b* such that an induced absorption is produced in the material of the glass sheet 44 along an extended portion 102*c*, seen in the direction of the beam, of the laser beam focal line 102*b*, with the effect that an induced crack formation takes place in the material of the substrate along this extended portion 102*c*.

In some embodiments, the glass sheet 44 is positioned in relation to the laser beam focal line 102*b* such that the extended portion 102*c* of the induced absorption in the material, that is to say in the interior of the glass sheet 44, extends up to at least one of the two opposite substrate surfaces 101*a*, 101*b*.

In certain embodiments, the glass sheet 44 is positioned in relation to the laser beam focal line 102*b* such that the extended portion 102*c* of the induced absorption in the material, that is to say in the interior of the glass sheet 44, extends from one 101*a* of the two opposite substrate surfaces up to the other 101*b* of the two opposite substrate surfaces, that is to say over the entire layer thickness d of the glass sheet 44 or in that the glass sheet 44 is positioned in relation to the laser beam focal line 102*b* such that the extended portion 102*c* of the induced absorption in the material, that is to say in the interior of the glass sheet 44, extends from one 101*a* of the two opposite substrate surfaces into the glass sheet 44, but not up to the other 101*b* of the two opposite substrate surfaces, that is to say not over the entire layer thickness d of the glass sheet 44, preferably extends over 80% to 98%, preferably over 85 to 95%, particularly preferably over 90%, of this layer thickness.

In some embodiments, the induced absorption is produced such that the crack formation takes place in the microstructure of the glass sheet 44 without ablation and without melting of material of the glass sheet 44.

In certain embodiments, the extent of the laser beam focal line 102*b* and/or the extent of the portion 102*c* of the induced absorption in the glass sheet 44, that is to say in the interior of the glass sheet 44, seen in each case in the longitudinal direction of the beam, is between 0.1 mm and 100 mm, preferably between 0.3 mm and 10 mm, and/or in that the layer thickness d of the glass sheet 44, measured perpendicularly to the two opposite substrate surfaces 101*a*, 101*b*, is between 30 µm and 3000 µm, preferably between 100 µm and 1000 µm. In some embodiments, the average diameter δ of the laser beam focal line 102*b*, that is to say the spot diameter, is between 0.5 µm and 5 µm, preferably between 1 µm and 3 µm, preferably is 2 µm, and/or in that the pulse duration τ of the laser 103 is chosen such that, within the time of interaction with the material of the glass sheet 44, the heat diffusion in this material is negligible, preferably no heat diffusion takes place, for which preferably τ, δ and the heat diffusion constant α of the material of the glass sheet 44 are set according to $\tau \ll \delta^2/\alpha$ and/or preferably τ is chosen to be less than 10 ns, preferably less than 100 ps, and/or in that the pulse repetition rate of the laser 103 is between 10 kHz and 1000 kHz, preferably is 100 kHz, and/or in that the laser 103 is operated as a single-pulse laser or as a burst-pulse laser, and/or in that the average laser power, measured directly on the output side of the beam of the laser 103, is between 10 watts and 100 watts, preferably between 30 watts and 50 watts.

In certain embodiments, the wavelength λ of the laser 103 is chosen such that the material of the glass sheet 44 is transparent to this wavelength or is substantially transparent, the latter being understood as meaning that the decrease in intensity of the laser beam taking place along the direction of the beam in the material of the glass sheet 44 per millimeter of the depth of penetration is 10% or less, the laser being, in particular for glasses or crystals that are transparent in the visible wavelength range as the glass sheet 44, preferably an Nd:YAG laser with a wavelength λ of 1064 nm or a Y:YAG laser with a wavelength λ of 1030 nm, or, in particular for semiconductor substrates that are transparent in the infrared wavelength range, preferably an Er:YAG laser with a wavelength λ of between 1.5 μm and 1.8 μm.

In some embodiments, the laser beam 102a, 102b is directed perpendicularly onto the glass sheet 44, in that therefore the glass sheet 44 is positioned in relation to the laser beam focal line 102b such that the induced absorption along the extended portion 102c of the laser beam focal line 102b takes place perpendicularly to the plane of the substrate or in that the laser beam 102a, 102b is directed onto the glass sheet 44 at an angle β of greater than 0° in relation to the normal to the plane of the glass sheet 44, in that therefore the glass sheet 44 is positioned in relation to the laser beam focal line 102b such that the induced absorption along the extended portion 102c of the laser beam focal line 102b takes place at the angle 90°-β to the plane of the substrate, where preferably β≤45°, preferably β≤30°.

Figure 9:
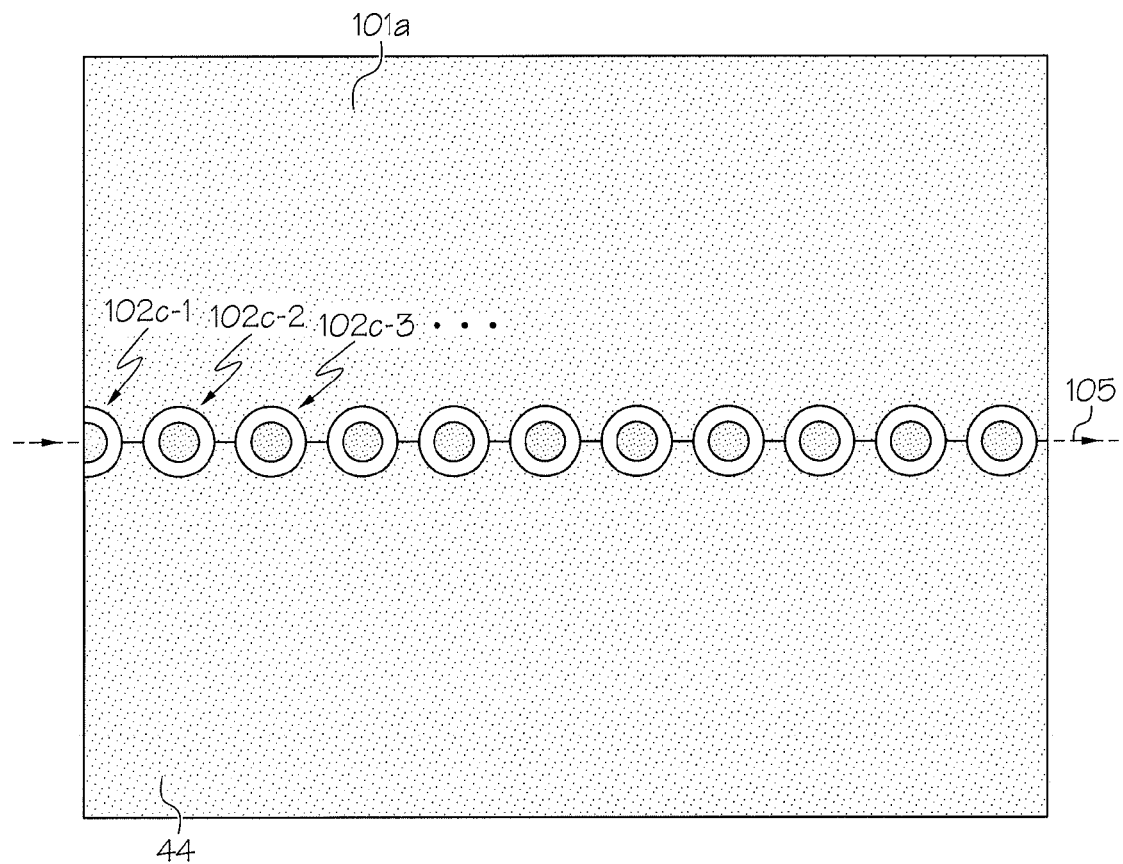
FIG. 9 represents a surface of a substrate machined using the glass sheet processing apparatus of FIG. 1.

Referring to FIG. 9, in certain embodiments, the laser beam 102a, 102b is moved in relation to the surface 101a of the glass sheet 44 along a line 105 along which the glass sheet 44 is to be severed to obtain the multiple parts, a multiplicity (102c-1, 102c-2, . . . ) of extended portions 102c of induced absorption in the interior of the glass sheet 44 being produced along this line 105, where preferably the ratio of the average spacing a of directly adjacent extended portions 102c of induced absorption, that is to say portions produced directly one after the other, and the average diameter δ of the laser beam focal line 102b, that is to say the spot diameter, is between 0.5 and 3.0, preferably between 1.0 and 2.0.

In some embodiments, during and/or after the production of the multiplicity (102c-1, 102c-2, . . . ) of extended portions 102c of induced absorption in the interior of the glass sheet 44, mechanical forces are exerted on the glass sheet 44 and/or thermal stresses are introduced into the glass sheet 44, in particular the substrate is unevenly heated and cooled again, in order to bring about crack formation for separating the substrate into the multiple parts respectively between directly adjacent (102c-1, 102c-2) extended portions 102c of induced absorption, the thermal stresses preferably being introduced by irradiating the glass sheet 44 with a $CO_2$ laser along the line 105.

Figure 10:
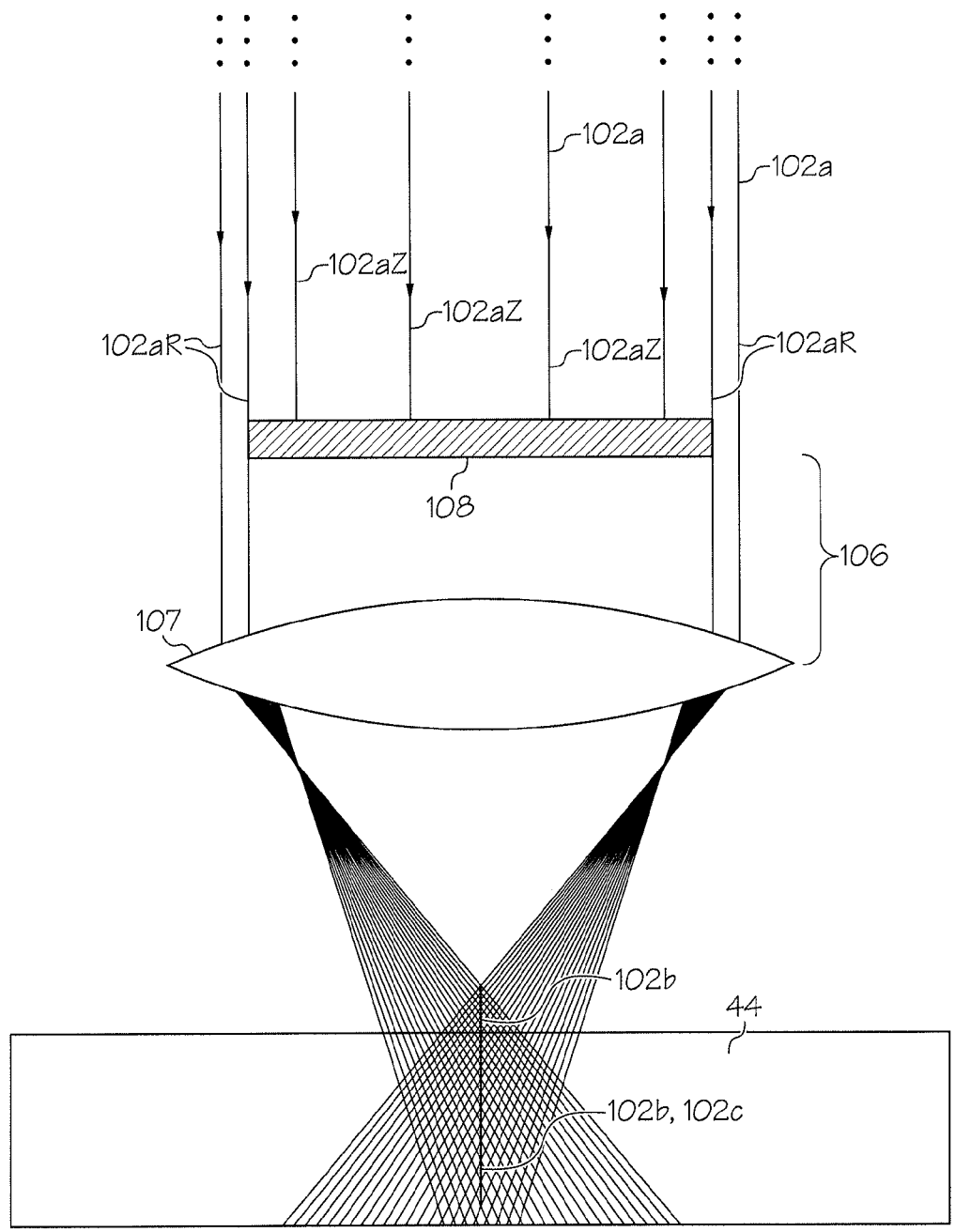
FIG. 10 illustrates another optical arrangement of a laser for use with the glass sheet processing apparatus of FIG. 1, according to one or more embodiments shown and described herein.

Referring to FIG. 10, a device for the laser-based machining of the glass sheet 44, in order to separate the substrate into multiple parts, with which the laser beam 102a, 102b of a laser 103 for machining the glass sheet 44 can be directed onto the latter, is characterized by an optical arrangement 106, which is positioned in the path of rays of the laser 103 and with which an extended laser beam focal line 102b, seen along the direction of the beam, can be formed on the beam output side of the optical arrangement 106 from the laser beam 102a directed onto the latter, the glass sheet 44 being able to be positioned or being positioned in relation to the laser beam focal line 102b such that an induced absorption takes place in the material of the glass sheet 44 along an extended portion 102c, seen in the direction of the beam, of the laser beam focal line 102b, with the effect that an induced crack formation is brought about in the material of the substrate along this extended portion 102c.

In certain embodiments, the optical arrangement 106 comprises a focusing optical element with spherical aberration, preferably a spherically ground convex lens 107, a diaphragm 108 of the optical arrangement 106, such as an annular diaphragm positioned before this focusing optical element 107 in the path of rays of the laser 103, with the effect that the bundle of rays (102aZ) lying at the center of the laser beam 102a impinging onto the diaphragm can be blocked out, so that only the peripheral rays (102aR) lying outside this center impinge onto this focusing optical element.

In some embodiments, the optical arrangement 106 comprises an optical element with a non-spherical free surface which is shaped for forming the laser beam focal line 102b with a defined extent, that is to say a defined length, seen in the direction of the beam, the optical element with the non-spherical free surface preferably being a cone prism or an axicon.

In certain embodiments, the optical arrangement 106 comprises in the path of rays of the laser 103 firstly a first optical element with a non-spherical free surface, which is shaped for the forming of the extended laser beam focal line 102b, preferably a cone prism or an axicon, and, on the beam output side of this first optical element, a second, focusing optical element, in particular a convex lens, these two optical elements being positioned and aligned such that the first optical element projects the laser radiation impinging on it annularly onto the second optical element, so that the extended laser beam focal line is produced on the beam output side of the second optical element.

In some embodiments, a third, focusing optical element, which is in particular a plano-convex collimation lens, is positioned between the first and second optical elements in the path of rays of the laser 103, the third optical element preferably being positioned and aligned such that the laser radiation formed annularly by the first optical element falls onto the third optical element with a defined average ring diameter and in that the third optical element projects the laser radiation annularly with this ring diameter and with a defined ring width onto the second optical element.

The methods or devices described above can be used for separating substrates of glass (e.g., having a thickness of about 0.7 mm or less), in particular of quartz, borosilicate, sapphire or soda-lime glass, sodium-containing glass, hardened glass or unhardened glass, of crystalline $Al_2O_3$, of $SiO_2 \cdot nH_2O$ (opal) or of a semiconductor material, in particular Si, GaAs, GaN, separating single- or multi-layered substrates, in particular glass-glass composites, glass-film composites, glass-film-glass composites or glass-air-glass composites, separating coated substrates, in particular metal-coated sapphire wafers, silicon wafers provided with metal or metal-oxide layers or substrates coated with ITO or AlZnO, and/or completely severing a single- or multi-layered substrate or severing one or more, but not all of the layers of a multi-layered substrate.

The laser beam focal line produced by means of the optical arrangement described above is alternatively also referred to above and below for simplicity as the focal line of the laser beam. The glass sheet 44 is separated or individually separated into the multiple parts, seen in the plane of the glass sheet 44, by the crack formation (induced absorption along the focal line made to extend perpendicularly to the plane of the substrate). The crack formation consequently takes place perpendicularly to the plane of the glass sheet 44 into the glass sheet 44 or into the interior of the substrate (longitudinal crack formation). As already described, generally a multiplicity of individual laser beam focal lines are introduced into the glass sheet 44 along a line on the substrate surface, in order that the individual parts of the glass sheet 44 can be separated from one another. For this purpose, either the glass sheet 44 may be made to move parallel to the plane of the glass sheet 44 in relation to the laser beam or in relation to the optical arrangement or, conversely, the optical arrangement may be moved parallel to the plane of the glass sheet 44 in relation to the glass sheet 44.

Example

Suitable, for example, for severing flat glasses is a commercially available picosecond laser 103, which has the following parameters: wavelength 1064 nm, pulse duration of 10 picoseconds, pulse repetition rate of 100 kHz, average power (measured directly after the laser) of up to 50 W. The laser beam initially has a beam diameter (measured at 13% of the peak intensity, i.e. $1/e^2$ diameter of a Gaussian bundle of rays) of about 2 mm, the beam quality is at least $M^2<1.2$ (determined in accordance with DIN/ISO 11146). With beam expanding optics (commercially available Kepler beam telescope), the beam diameter is increased by a factor of 10 to about 20-22 mm (21, 23, 24 and 25 are beam-deflecting mirrors). With a so-called annular diaphragm 8 of 9 mm in diameter, the inner part of the bundle of rays is cut off, so that an annular beam forms. With this annular beam, a plano-convex lens with a 28 mm focal length (quartz glass with a radius of 13 mm) is illuminated for example. The strong (desired) spherical aberration of the lens has the effect of producing the focal line.

Figure 11:
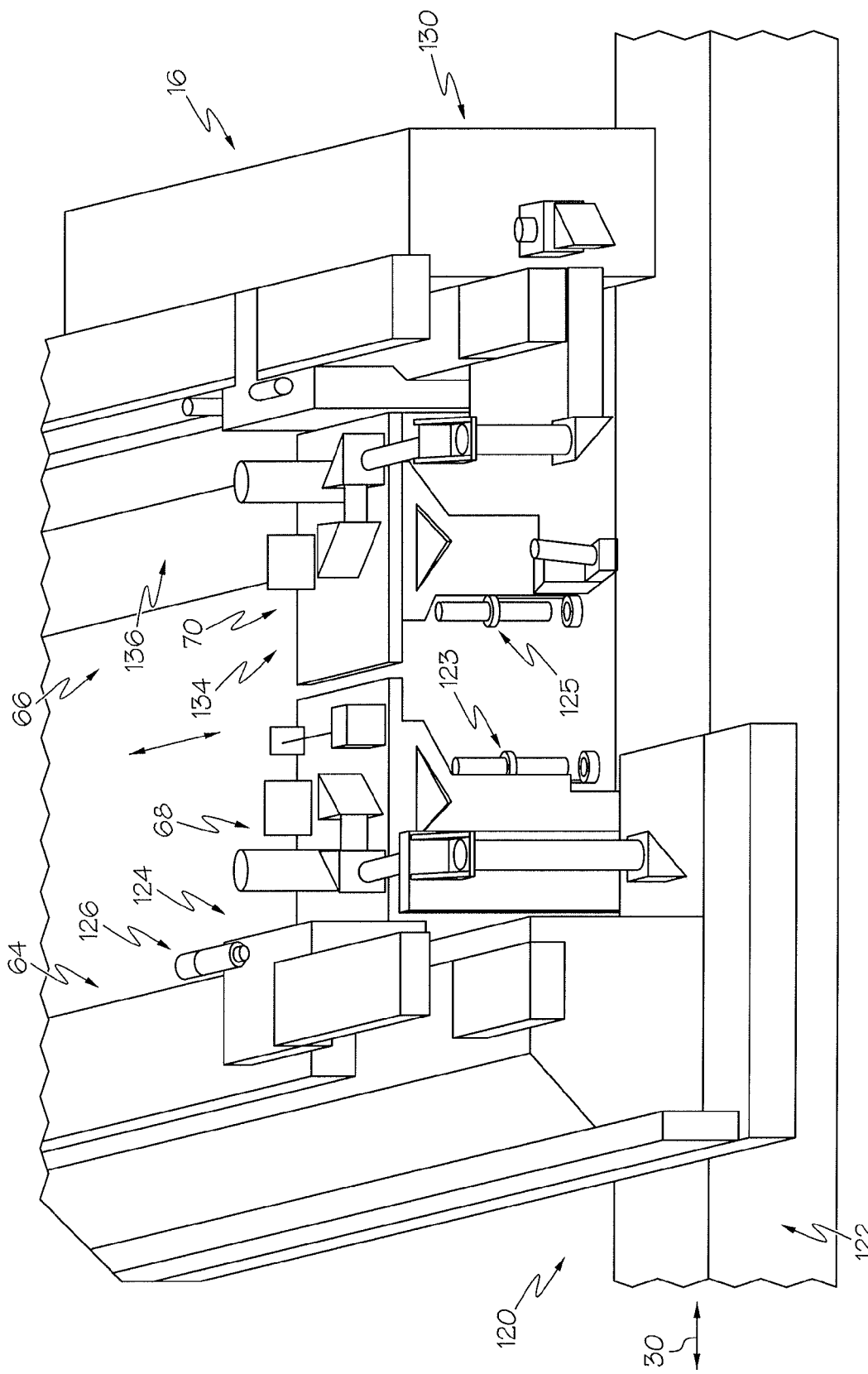
FIG. 11 illustrates a multi-gantry assembly for use with the glass sheet processing apparatus of FIG. 1, according to one or more embodiments shown and described herein.

Referring to FIG. 11, the first gantry assembly 64 and the second gantry assembly 66 are illustrated. One or both of the gantry assemblies 64 and 66 may include a laser cutting assembly 123, 125 that is suitable for use in severing the glass sheet 44, such as described above, as an example. The first gantry assembly 64 includes a base assembly 120 that is slidably connected to the track assembly 122 extending alongside the glass sheet processing station 16. The track assembly 122 allows linear movement of the first gantry assembly 64 in the machine direction 30. A processing head support assembly 124 is supported by the base assembly 120. The processing head support assembly 124 provides the track assembly 126 that allows linear movement of the processing head 68 in the cross-machine direction 32 using a linear actuator. Thus, with the machine direction track assembly 122 and the cross-machine direction track assembly 126, positioning of the processing head 68 and associated laser cutting assembly 123 anywhere in an X-Y plane can be achieved.

The second gantry assembly 66 includes a base assembly 130 (a base plate of the base assembly is removed for illustration) that is slidably connected to the track assembly 122 extending alongside the glass sheet processing station 16. The track assembly 122 allows linear movement of the second gantry assembly 66 in the machine direction 30. A processing head support assembly 134 is supported by the base assembly 130. The processing head support assembly 134 provides a track assembly 136 that allows linear movement of the processing head 70 in the cross-machine direction 32 using a linear actuator. Thus, with the machine direction track assembly 132 and the cross-machine direction track assembly 136, positioning of the processing head 70 and associated laser cutting assembly 125 anywhere in an X-Y plane can be achieved.

Figure 12:
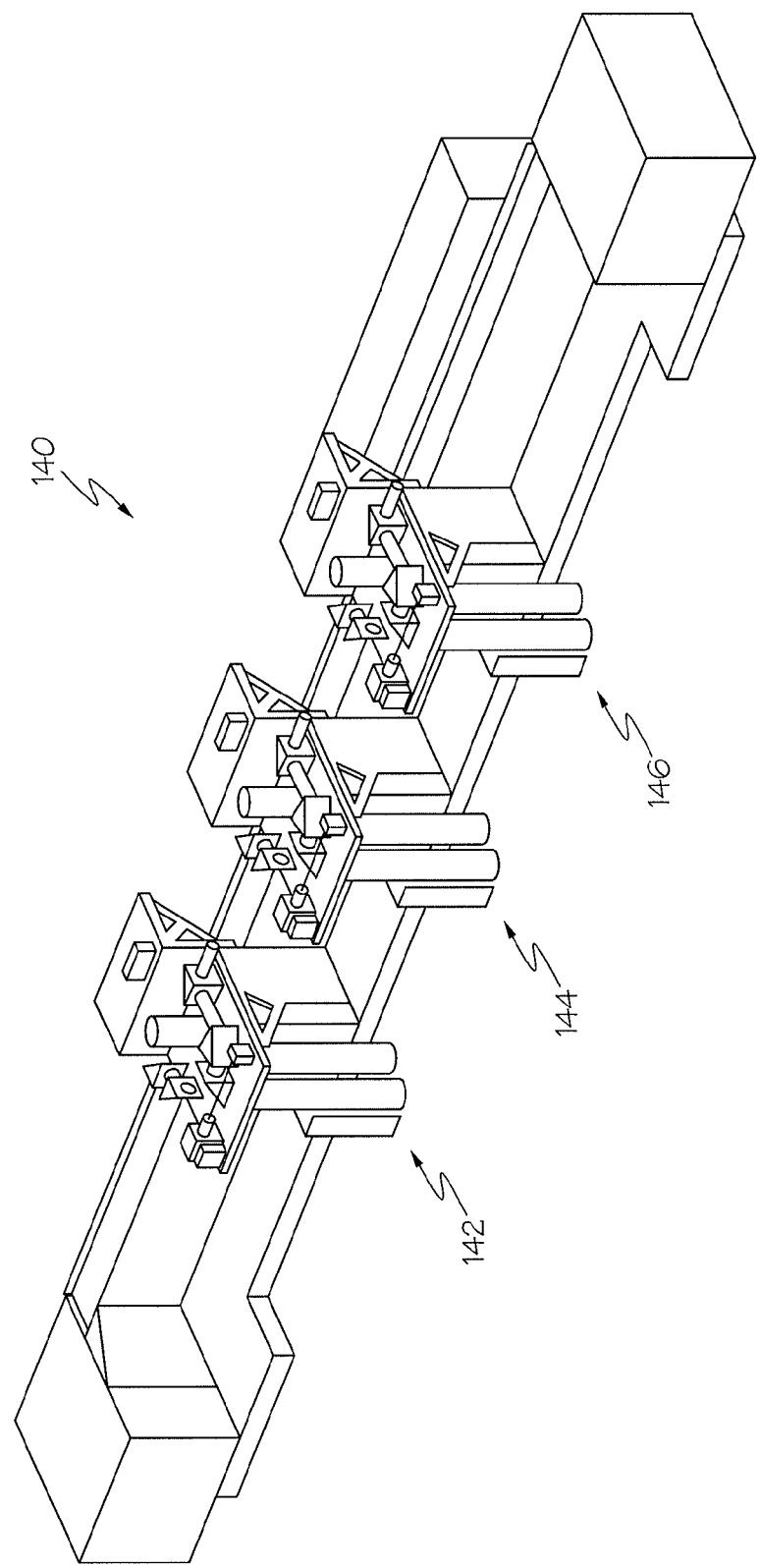
FIG. 12 illustrates a gantry assembly including multiple processing heads, according to one or more embodiments shown and described herein.

While a gantry assembly embodiment is illustrated by FIG. 11 that includes a single processing head (one for each gantry assembly), in some embodiments, a gantry assembly 140 may include more than one processing heads 142, 144 and 146, all provided on the same gantry assembly 140 as shown by FIG. 12. As above, any one or more of the processing heads 142, 144 and 146 may include a laser cutting assembly used in severing the glass sheet 44. While any one or more of the processing heads 142, 144 and 146 may include the laser cutting assemblies, they may include other tools for processes other than substrate separation, such as sprayers for dies and coatings, cleaning nozzles and other processing tools. The additional processing heads 142, 144 and 146 can allow for machining of additional parts from the same or multiple glass sheets 14. The parts may be substantially the same or they may be different. The multiple processing heads 142, 144, 146 may utilize their own linear actuator to allow for independent control of the processing heads 142, 144, 146. Laser beam splitting may be employed to provide a laser beam to the optics of different processing heads simultaneously.

Figure 13:
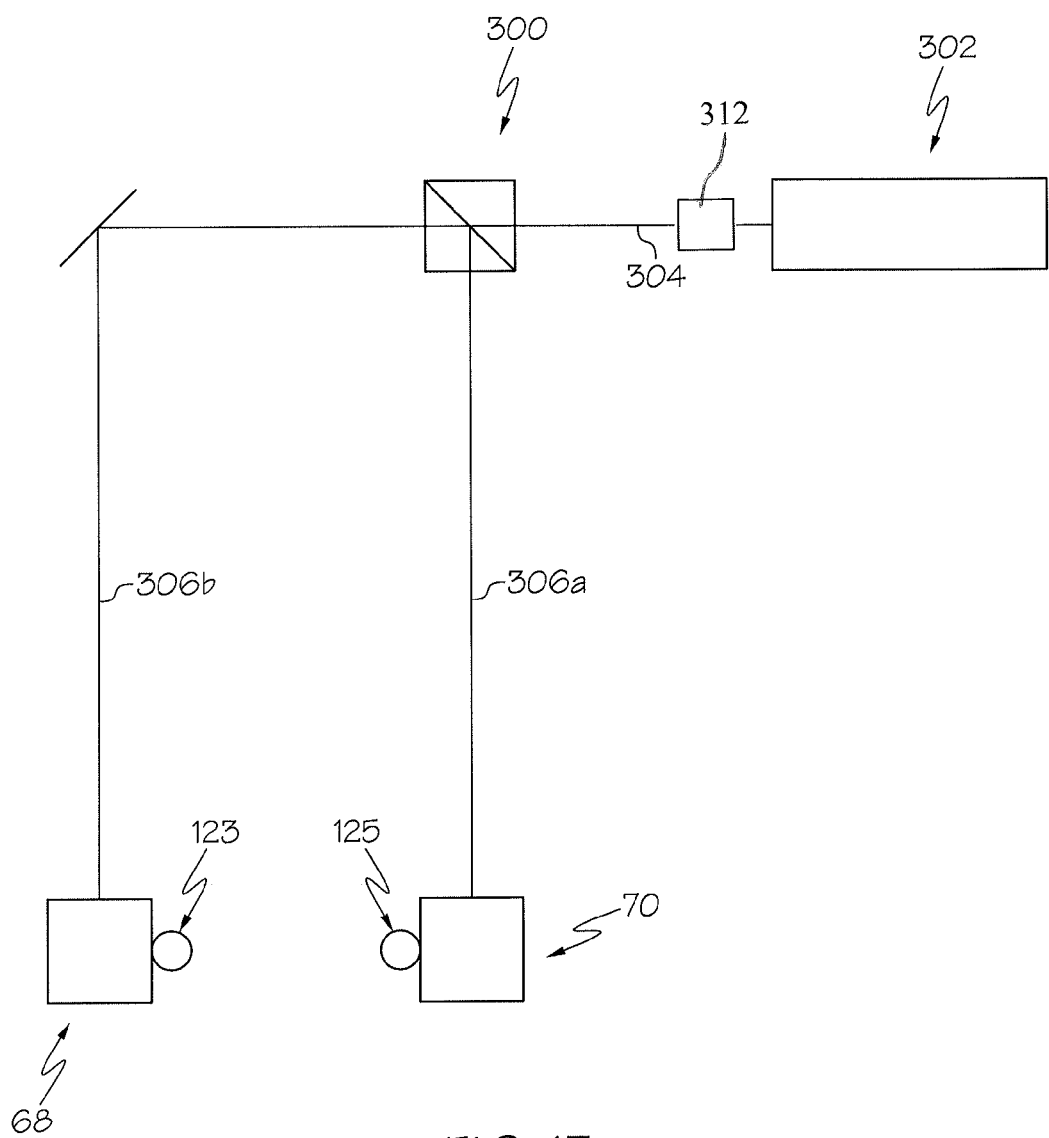
FIG. 13 is a schematic illustration of a beam splitting arrangement for the glass sheet processing apparatus of FIG. 1, according to one or more embodiments shown and described herein.

Referring briefly to FIG. 13, for example, a beam splitting device 300 may be located in a laser beam path of a laser source 302. The beam splitting device 300 may include an optical arrangement that is suitable to split an initial laser beam 304 provided by the laser source 302 into two separate laser beams 306a and 306b. Each laser beam 306a and 306b may be delivered to a respective processing head and laser cutting assembly, such as the processing heads 68 and 70 and laser cutting assemblies 123 and 125. In some embodiments, the laser source 302 may utilize an optical arrangement 312 that alters an energy profile of the laser beam 304 that can be useful in perforating the glass sheets and can be split into multiple laser beams 306a and 306b. In some embodiments, the optical arrangement 312 may include a waxicon optical arrangement that is used to alter the energy profile of the laser beam 304. Such an optical arrangement can reduce costs and complexity associated with multiple laser sources to generate the separate laser beams 306a and 306b.

Figure 14:
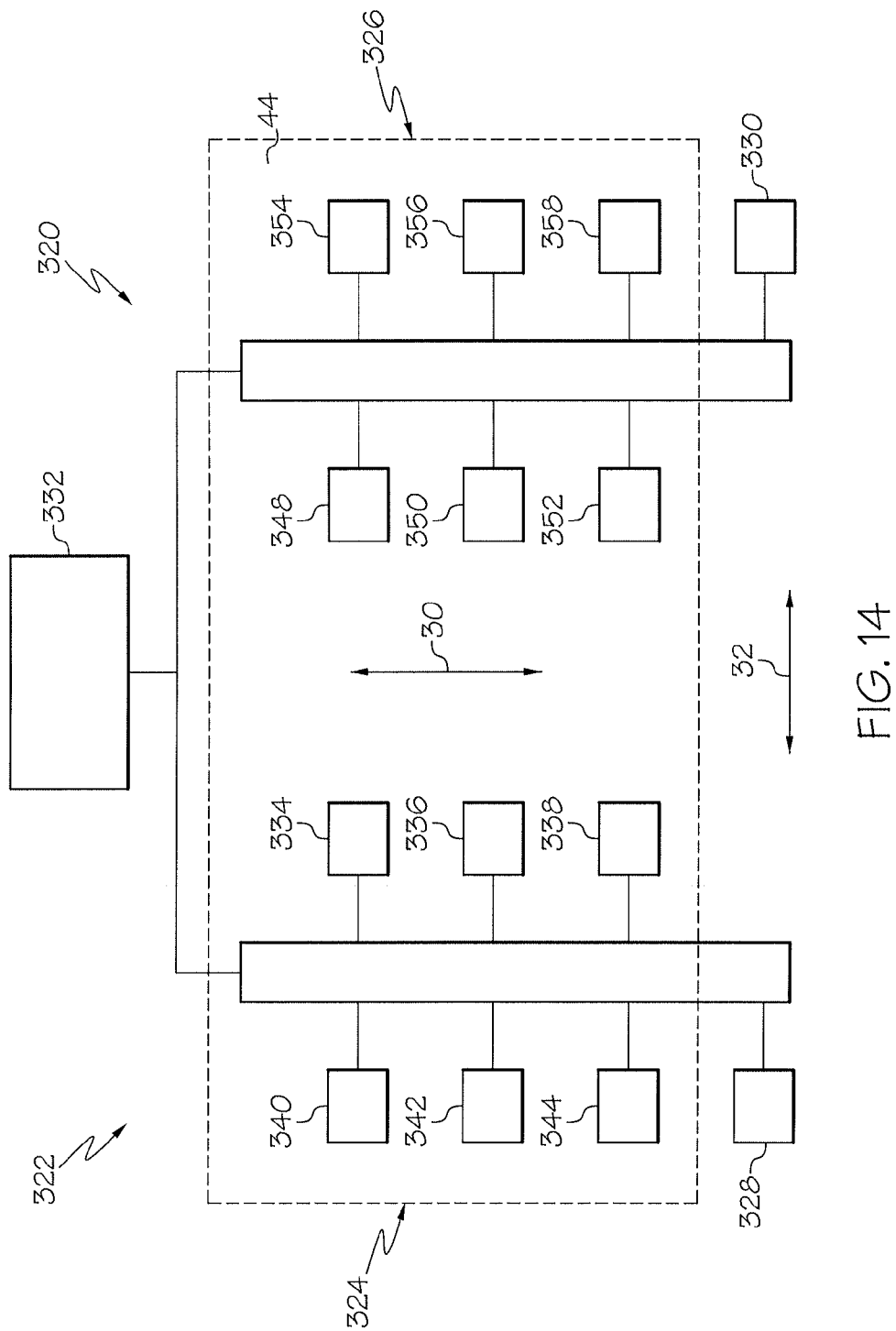
FIG. 14 illustrates a glass waste processing apparatus for use with the glass sheet processing apparatus of FIG. 1, according to one or more embodiments shown and described herein.

Referring, for example, to FIG. 14, a diagrammatic illustration of a substrate processing station 320 for use with the glass sheet processing apparatus 10 of FIG. 1 includes a multi-gantry processing apparatus 322. The multi-gantry processing apparatus 322 includes a first gantry assembly 324 and a second gantry assembly 326 with each first and second gantry assembly 324 and 326 extending across the glass sheet 44 in the cross-machine direction 30. As above, the first gantry assembly 324 may have a linear motor 328 operatively connected thereto for effectuating movement of the first gantry assembly 324 in the machine direction 32. Likewise, the second gantry assembly 326 may also include a linear motor 330 operatively connected thereto for effectuating movement of the second gantry assembly 326 in the machine direction. A controller 332 may include logic that controls simultaneous movement or otherwise of the first gantry assembly 324 and the second gantry assembly 326 in a cooperative manner.

The first gantry assembly 324 may include multiple processing heads 334, 336 and 338. Each processing head 334, 336 and 338 may have a linear motor 340, 342 and 344 operatively connected thereto for effectuating movement of the processing heads 334, 336 and 338 in the cross-machine direction 30 along a length of the first gantry assembly 324. Likewise, the second gantry assembly 326 may include multiple processing heads 348, 350 and 352. Each processing head 348, 350 and 352 may have a linear motor 354, 356 and 358 operatively connected thereto for effectuating movement of the processing heads 348, 350 and 352 in the cross-machine direction along a length of the second gantry assembly 226. The controller 332 may include logic that control simultaneous movement or otherwise of the processing heads 334, 336, 338, 348, 350 and 352 in a cooperative manner.

Such a multi-gantry processing apparatus can allow for machining of portions of a single glass sheet 44 simultaneously or for simultaneous machining of multiple glass sheets 44 as the same or different processes. For example, the multiple gantry assemblies 324 and 326 with their associated multiple processing heads 334, 336, 338, 348, 350 and 352 can allow for machining of multiple, discreet sections simultaneously or otherwise in a split pattern process, which can reduce cutting time associate with machining multiple parts from glass sheets. In some embodiments, the laser cutting assemblies may each be configured to provide multiple laser beams that can be used to form desired part shapes. Glass sheets up to 5000 mm×5000 mm, such as between about 100 mm×100 mm to about 5000 mm×5000 mm and between about 25 μm and about 10 mm in thickness may be machined.

Figure 15:
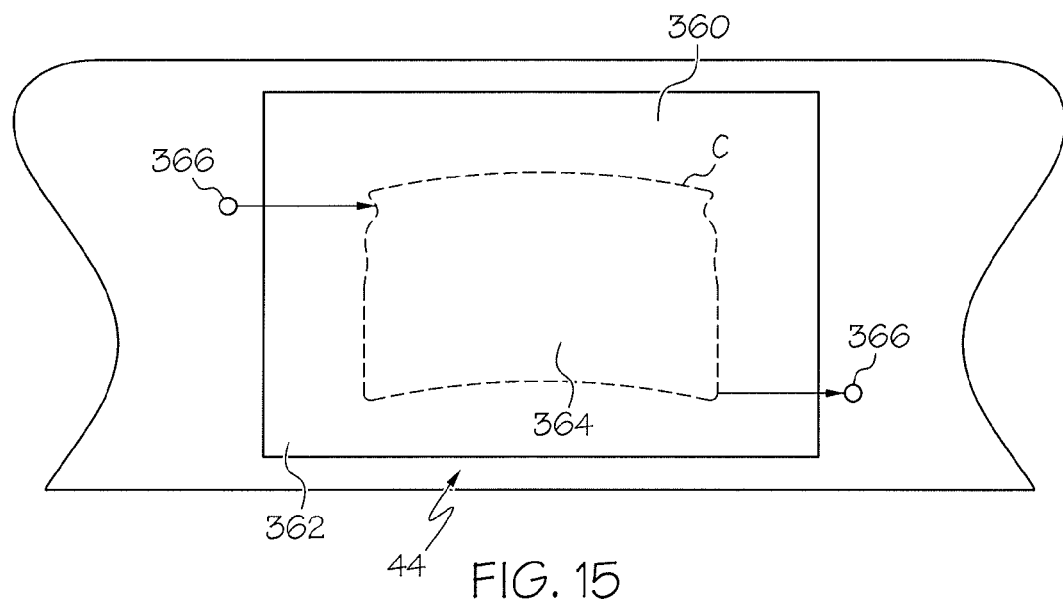
FIG. 15 is a schematic illustration of a glass cutting process, according to one or more embodiments shown and described herein.

Referring now to FIG. 15, a glass sheet cutting process is illustrated where outer sections 360 and 362 of the glass sheet 44 are separated from an inner section 364 of the glass sheet 44. In this example, the outer sections 360 and 362 may be considered scrap and the inner section 364 may be a quality part that is formed by severing the glass sheet 44, ultimately forming three disconnected sections 360, 362 and 364. A laser beam 366 provided by one of the laser cutting assemblies and associated processing heads described above may initiate the cutting operation at a location spaced away from the glass sheet 44 with the glass sheet being held flat against the glass holding conveyor belt 60 using negative pressure as described above. Because the laser beam 366 initiates a cutting path, which is represented by dashed lines C, at a location spaced from the glass sheet 44, the laser beam 366 is directed onto an upper conveyor belt surface 368 before being directed onto the glass sheet 44 and following the cutting path C.

Figure 16:
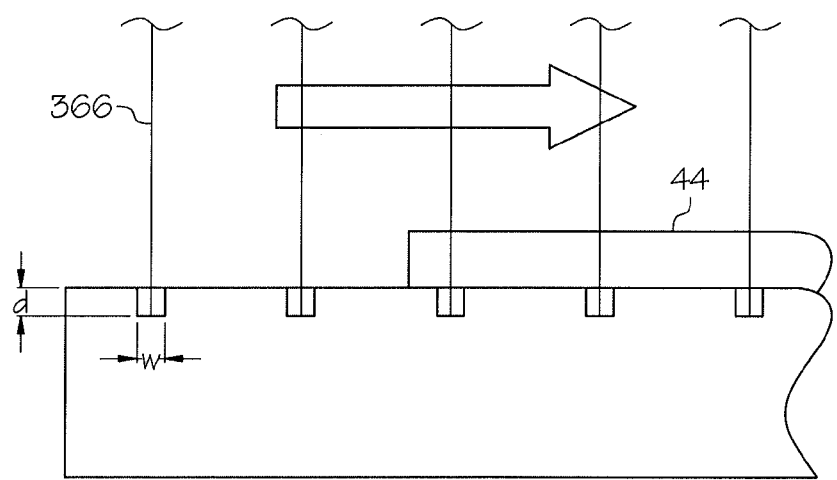
FIG. 16 is another schematic illustration of the glass cutting process of FIG. 15.

Referring to FIG. 16, the laser cutting assembly provides a succession of laser beams 366 that directly impact the glass holding conveyor belt 60 as the laser cutting assembly moves toward the glass sheet 44. As discussed above, the glass holding conveyor belt 60 may be formed of POM C, which is suitable to contact the glass sheets 44 and has a thermal resistance that can reduce alteration of the glass holding conveyor belt 60 during the laser cutting process. As one example, the laser beam 366, such as that provided by the laser described in the Example above, may create a recess 372 in the glass holding conveyor belt 60 that is no greater than about 300 microns in depth d and no greater than about 300 microns in width w. Such an arrangement can allow the glass holding conveyor belt 60 to be reused repeatedly for multiple glass sheets 44 without any need to replace portions of the glass holding conveyor belt 60.

Referring back to FIG. 1, the glass sheet processing apparatus 10 may include a glass unloading station 150 where desired glass parts formed from the glass sheets 44 may be removed from the glass holding conveyor belt 60. The glass parts may be removed manually or automatically, for example, by a robot, leaving glass scrap on the glass holding conveyor belt 60. The glass scrap may then be conveyed on the glass holding conveyor belt 60 to the glass waste disposal station 18.

Figure 17:
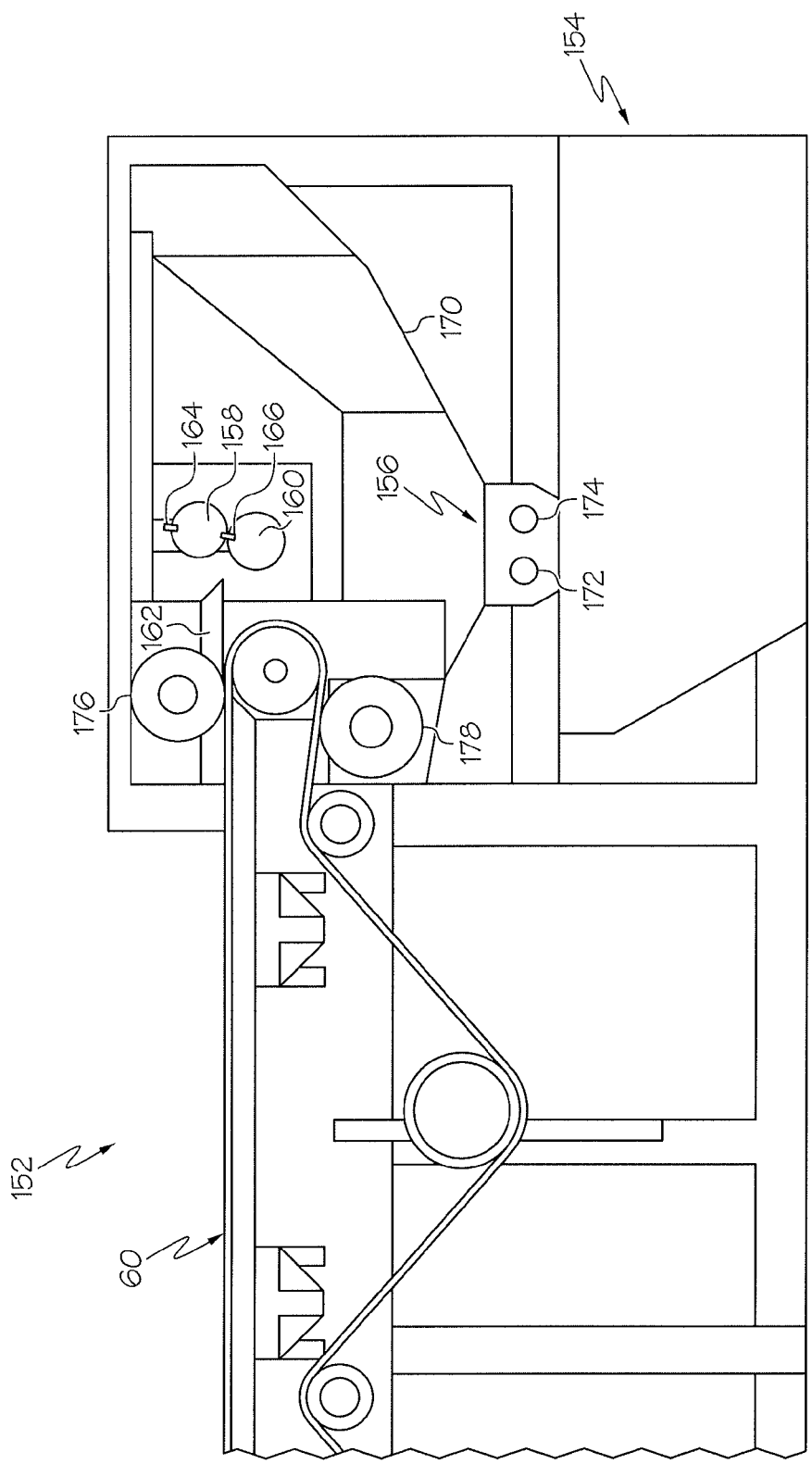
FIG. 17 illustrates a glass waste processing apparatus for use with the glass sheet processing apparatus of FIG. 1, according to one or more embodiments shown and described herein.

Referring to FIG. 17, the glass waste disposal station 18 includes a glass waste processing apparatus 152 that can further break down the glass waste into smaller sizes for depositing into a holding location 154 (e.g., a bin). The glass waste processing apparatus 152 includes a first glass breaking assembly 155 and a second glass breaking assembly 156. The first glass breaking assembly 155 includes a first break roller 158 and a second break roller 160 that receive glass waste 162 from the glass holding conveyor belt 60. In the illustrated example, the first break roller 158 includes a pair of blades 164 and 166 that engage and break the glass waste 162 (e.g., every 180 degrees of rotation) against the second break roller 160 in a cross-machine direction break. A brush roller 176 may be provided to dampen the shock of the first glass breaking assembly 155 on the glass waste 162 and also to inhibit or shield the belt surface from broken glass particles. Another brush roller 178 may be provided to clean the surface of the glass holding conveyor belt 60. The broken glass waste 168 may then slide down a ramp structure 170 toward the second glass breaking assembly 156. The second glass breaking assembly 156 may include a first break roller 172 and a second break roller 174. The first and second break rollers 172 and 174 may include saw-like teeth that further break the broken glass waste 168 in the machine direction. The broken glass waste 168 may then be deposited in the holding location 154.

Handling of glass-like substrates can be awkward and complex in terms of retaining flatness and stability during and after parts separation. The above-described glass sheet processing apparatus can provide a glass holding conveyor belt that can hold the substrate thereagainst by applying a vacuum force against the substrate that does not interfere with cutting processes or substrate quality. The glass sheet processing station uses a glass holding conveyor belt that can be used to carry multiple glass sheets to the laser cutting apparatus for multiple cutting and severing operations in a repeated fashion (i.e., one after another) with minimal, micron-sized affect on the surface of the glass holding conveyor belt. The glass sheet loading station may be provided that includes a tiltable table support body that can transfer the substrate to the glass holding conveyor belt by relatively small, individual belts, since the substrate is not yet separated. The glass sheet centering station may be provided that can align the substrate to an XY orientation for proper processing positioning. A glass waste disposal station may be provided that can further reduce the size of the waste removed from the parts.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A glass sheet processing apparatus comprising:
 a first gantry assembly that extends across a glass sheet in a cross-machine direction, the first gantry assembly comprising a first processing head and a second processing head, which move along a length of the first gantry assembly, and comprising a laser that provides a laser beam,
  the laser comprising an optical arrangement that is positioned in a beam path of the laser beam and that is configured to split the laser beam into a first laser beam provided to the first processing head and a second laser beam provided to the second processing head, the first laser beam and the second laser beam each providing a laser beam focal line that is configured to form a fracture surface area in the glass sheet, the optical arrangement comprising a first focusing optical element and a second focusing optical element spaced apart from the first focusing optical element, the first and second focusing optical elements being configured to generate each laser beam focal line on a beam output side of the second focusing optical element, and the optical arrangement comprising a third focusing optical element positioned between the first focusing optical element and the second focusing optical element along the beam path of the laser beam; and a second gantry assembly that extends across the glass sheet in the cross-machine direction, the second gantry assembly comprising a third processing head that moves along a length of the second gantry assembly.

2. The glass sheet processing apparatus of claim 1 further comprising a first linear actuator operatively connected to the first gantry assembly that moves the first gantry assembly in a machine direction.

3. The glass sheet processing apparatus of claim 2 further comprising a second linear actuator operatively connected to the second gantry assembly that moves the second gantry assembly in the machine direction.

4. The glass sheet processing apparatus of claim 1, wherein the third processing head of the second gantry assembly comprises a laser comprising an optical arrangement positioned in a beam path of the laser providing a laser beam focal line that is formed on a beam output side of the optical arrangement.

5. The glass sheet processing apparatus of claim 1 further comprising a controller that controls movement of the processing heads of the first gantry assembly and the second gantry assembly.

6. The glass sheet processing apparatus of claim 1, wherein the second gantry assembly comprises multiple processing heads where each processing head of the second gantry assembly moves along a length of the second gantry assembly in the cross-machine direction.

7. The glass sheet processing apparatus of claim 1 further comprising a conveyor belt configured to carry a glass sheet through the glass sheet processing apparatus, the conveyor belt comprising first and second belt segments connected together and configured to articulate relative to each other.

8. The glass sheet processing apparatus of claim 1, wherein the first focusing optical element is an axicon and the second focusing optical element is a convex lens.

9. The glass sheet processing apparatus of claim 8, wherein the third focusing optical element is a plano-convex collimation lens.

10. The glass sheet processing apparatus of claim 1, wherein the processing head of the second gantry assembly comprises a processing tool that is different from the first processing head and from the second processing head.

11. The glass sheet processing apparatus of claim 10, wherein the processing head of the second gantry assembly comprises a sprayer or a cleaning nozzle.

12. The glass sheet processing apparatus of claim 1, wherein the optical arrangement is further configured to split the laser beam into the first laser beam provided to the first processing head, the second laser beam provided to the second processing head, and a third laser beam provided to the third processing head, the first laser beam, the second laser beam, and the third laser beam each providing a laser beam focal line that is configured to form a fracture surface area in the glass sheet.

* * * * *